(12) United States Patent
Wadman et al.

(10) Patent No.: US 11,305,179 B1
(45) Date of Patent: Apr. 19, 2022

(54) SYSTEMS AND METHODS FOR IN-PERSON LIVE ACTION GAMING

(71) Applicant: Michael Wadman, Mapleton, UT (US)

(72) Inventors: Michael Wadman, Mapleton, UT (US); Jeremy Paul Willden, Pleasant Grove, UT (US); Martin Robert Johnson, Draper, UT (US); Helaman David Pratt Ferguson, Orem, UT (US); Eric Thomas Alsop, Saratoga Springs, UT (US); Jonathan Scott Jensen, Pocatello, ID (US); Joshua Liddell Workman, Draper, UT (US)

(73) Assignee: Michael Wadman, Mapleton, UT (US)

( * ) Notice: Subject to any disclaimer, the term of this patent is extended or adjusted under 35 U.S.C. 154(b) by 0 days.

(21) Appl. No.: 17/026,817

(22) Filed: Sep. 21, 2020

Related U.S. Application Data

(60) Provisional application No. 62/908,746, filed on Oct. 1, 2019.

(51) Int. Cl.
| | |
|---|---|
| *A63F 9/02* | (2006.01) |
| *A63F 11/00* | (2006.01) |
| *A63F 9/24* | (2006.01) |
| *F41J 5/04* | (2006.01) |
| *G06E 1/00* | (2006.01) |

(52) U.S. Cl.
CPC .......... *A63F 9/0278* (2013.01); *A63F 9/0252* (2013.01); *A63F 9/24* (2013.01); *A63F 11/0051* (2013.01); *F41J 5/04* (2013.01); *G06E 1/00* (2013.01); *A63F 2009/0282* (2013.01); *A63F 2009/2442* (2013.01); *G05B 2219/37281* (2013.01)

(58) Field of Classification Search
CPC ........ A63F 9/0278; A63F 9/0252; A63F 9/24; A63F 11/0051; A63F 2009/0282; A63F 2009/2442; A63F 9/0291; F41J 5/04; G06E 1/00; A41D 1/04
See application file for complete search history.

(56) References Cited

U.S. PATENT DOCUMENTS

| | | | | |
|---|---|---|---|---|
| 5,195,752 A | * | 3/1993 | Reeves | F41G 3/26 2/102 |
| 5,893,562 A | * | 4/1999 | Spector | A63F 9/0243 273/349 |
| 5,984,788 A | * | 11/1999 | Lebensfeld | A63F 9/0291 463/51 |
| 9,028,312 B1 | * | 5/2015 | Wei | A63F 13/28 463/2 |
| 9,067,127 B2 | * | 6/2015 | Clark | A63F 9/0291 |
| 2002/0037759 A1 | * | 3/2002 | Aldridge | A63B 71/12 463/1 |
| 2015/0290536 A1 | * | 10/2015 | Schumacher | A63F 13/35 463/7 |
| 2017/0007919 A1 | * | 1/2017 | Cohen | A63F 13/21 |
| 2018/0133530 A1 | * | 5/2018 | Chen | A63B 5/11 |
| 2018/0353845 A1 | * | 12/2018 | Fischer | G06K 7/10386 |
| 2019/0054374 A1 | * | 2/2019 | Pesante | A63F 13/285 |
| 2019/0321718 A1 | * | 10/2019 | Margareten | F41J 5/02 |
| 2020/0306620 A1 | * | 10/2020 | Kennedy | A63F 9/0243 |

* cited by examiner

*Primary Examiner* — Michael D Dennis
(74) *Attorney, Agent, or Firm* — HDC Intellectual Property Law, LLP

(57) ABSTRACT

Various embodiments provide systems and methods for live action gaming.

26 Claims, 10 Drawing Sheets

SYSTEMS AND METHODS FOR IN-PERSON LIVE ACTION GAMING

CROSS REFERENCE TO RELATED APPLICATIONS

The present application claims priority to (i.e., is a non-provisional of) U.S. Pat. App. No. 62/908,746 entitled "Systems and Methods for In-Person Live Fire Gaming", and filed Oct. 1, 2019 by Wadman. The entirety of the aforementioned reference is incorporated herein by reference for all purposes.

FIELD OF THE INVENTION

Embodiments are related to systems and methods for gaming.

BACKGROUND

Traditional gaming scenarios are often unrealistic making the game feel contrived and less engaging. Often gaming is purely virtual in which case the game lacks the feel achievable by co-locating multiple players, and/or the gaming lacks sufficient sensory engagement to bring the player fully into the experience.

Hence, for at least the aforementioned reasons, there exists a need in the art for advanced systems and methods for gaming.

SUMMARY

Embodiments are related to systems and methods for gaming.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
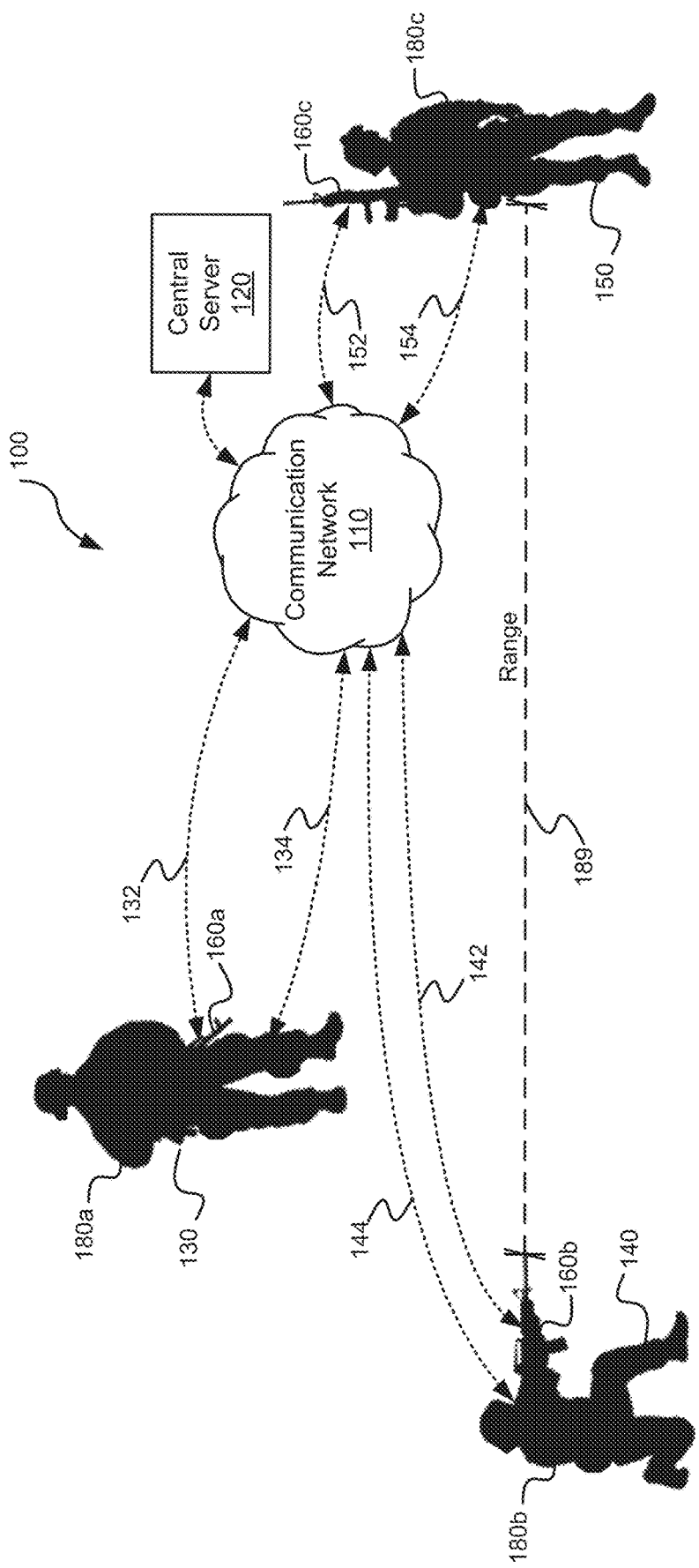
FIG. 1a is a block diagram of a game scenario in accordance with various embodiments including players wearing gaming outfits and carrying guns.

Embodiments are related to systems and methods for gaming.

Various embodiments discussed herein provide systems, methods, devices, and/or methods for multiplayer, in-person game play. The game may be played in an enclosed indoor arena with possible obstacles and other elevations. Each player has a gun and a suit. In some cases, the gun will be fully automatic (i.e., firing a continuous stream of projectiles until a trigger is released), is bursty (i.e., firing a finite number greater than one of projectiles upon each distinct pull of the trigger), is a semi-automatic (i.e., firing a single projectile on each distinct pull of the trigger), or is manual (i.e., requiring a manual loading of the gun followed by a trigger pull for each projectile fired). The projectiles are made of foam or other substance that will soften impact, and yet dense enough to move through an atmosphere at a rate of about 100 feet per second when measured at the muzzle of the gun. A combination of a density of the projectile along with a velocity at which the projectile leaves the muzzle of the gun may be programmable such that the combination of velocity and density allow the projectile to impinge another player without penetrating, but offering a varying impact intensity. For example, a force at which the projectile impacts another player in the arena at a defined distance from the gun shooting the projectile can be programmed range from allowing the impacted individual to feel a painful hit (like paintball) all the way to an impact that can be sensed by a sensor in the suit but not by the individual wearing the suit. Such programming may be done via a central server, and may be modified in real time as a game is being played. In some cases, the gun is equipped with a range finder and will not fire a projectile unless the target range is greater than a programmable distance away. This allows for increasing the force at which projectiles impact other players while keeping game operation within defined safety limits. In some embodiments, the suit will be able to detect impacts and which gun/player fired the shot. A game will be played between two or more players in which shots will be fired and points scored or credit given. The arena will have a projectile retrieval system to receive and redistribute that projectiles to reloading stations. Players can utilize the reloading stations during the game to replenish their personal supply of projectiles in order to continue playing the game.

A variety of games may be played including:
Team vs. team
Everybody against everybody/free for all
Hide and seek
King of the hill
Sharp shooting or target practice
Any of these: https://skytechlasers.com/laser-tag-games-to-play-at-home/

Last man standing

Highest hit score, fewest misses, unlimited lives, limited lives

Leagues or clubs may form using this technology

Some embodiments provide live action game systems that include a region of play, a first gun and a first gaming outfit associated with a first player, a second gun and a second gaming outfit associated with a second player, and a central server. The region of play includes: a projectile load station configured to provide projectiles to at least the first player and the second player within the region of play; at least one location detection device configured to detect the location of at least the first player and the second player within the region of play; and a projectile collection system configured to collect projectiles propelled by the first gun associated with the first player and projectiles propelled by the second gun associated with the second player, and to return the collected projectiles to the projectile load station. The first gaming outfit includes a processing circuit operable to: detect that a second player associated with the second gaming outfit is targeting a first player associated with the first gaming outfit to yield a player identification; detect an impact with the first gaming outfit to yield an impact identification; and determine a shot hit by the second player against the first player by a projectile propelled by the second gun based upon a combination of the player identification and the impact identification. The central server is configured to: receive the shot hit from the first gaming outfit, and the location of at least the first player and the second player within the region of play from the location detection device; and transmit game information to the first gaming outfit and the second gaming outfit.

Other embodiments provide methods for live action gaming. Such methods include: providing a first gaming outfit to a first player and a first gun to the first player; providing a second gaming outfit to a second player and a second gun to the second player; detecting in the first gaming outfit that the second player is targeting the first player to yield a player identification; detecting in the first gaming outfit an impact to yield an impact identification; and determining a shot hit by the second player against the first player by a projectile propelled by the second gun based upon a combination of the player identification and the impact identification. In some instances of the aforementioned embodiments, detecting in the first gaming outfit that the second player is targeting the first player to yield a player identification includes detecting that the second gun is aimed at the first player. In such instances, the player identification is a gun identification identifying the second gun.

Various instances of the aforementioned embodiments further include detecting in the first gaming outfit a projectile release by the second gun to yield a projectile release indication. In such instances, determining the shot hit by the second player against the first player by a projectile propelled by the second gun is based upon a combination of the gun identification, the impact identification, and the projectile release indication. In yet additional instances of the aforementioned embodiments, the methods further include detecting in the first gaming outfit a range of the second gun to the first gaming outfit to yield a range indication. In such instances, determining the shot hit by the second player against the first player by a projectile propelled by the second gun is based upon a combination of the gun identification, the impact identification, the projectile release indication, and the range indication.

In some instances of the aforementioned embodiments, determining the shot hit by the second player against the first player by a projectile propelled by the second gun is based upon a combination of the gun identification, the impact identification, and a projectile release indication indicating a projectile release from the second gun. In one or more instances of the aforementioned embodiments, the methods further include: determining the shot hit by the second player against the first player by a projectile propelled by the second gun is based upon a combination of the gun identification, the impact identification, a projectile release indication indicating a projectile release from the second gun, and a range indication indicating a distance from the second gun to the first player.

In various instances of the aforementioned embodiments, the methods further include receiving in the first gaming outfit a projectile release indication indicating the release of a projectile by the second gun. In such instances, determining the shot hit by the second player against the first player by a projectile propelled by the second gun is based upon a combination of the gun identification, the impact identification, and the projectile release indication. In some such instances, the methods further include receiving in the first gaming outfit a range indication indicating a distance of the second gun to the first gaming outfit. In such instances, determining the shot hit by the second player against the first player by a projectile propelled by the second gun is based upon a combination of the gun identification, the impact identification, the projectile release indication, and the range indication.

In some instances of the aforementioned embodiments, the second gun includes: a range finder configured to determine an approximate distance from the second gun to the first gaming outfit; a trigger mechanism configured to cause the second gun to propel a projectile; and an optical modulation device capable of transmitting an optically modulated signal. The optically modulated signal includes an identification of the second gun.

In various instances of the aforementioned embodiments, the first gaming outfit includes: an impact detection pad configured to sense an impact by a projectile propelled from the second gun; and an optical decoder receiver configured to receive an optically modulated signal from the second gun. The optically modulated signal includes an identification of the second gun. In some such instances, the impact detection pad is an electrical continuity-based impact pad including a first electrode and a second electrode. The impact detection pad is configured to signal an impact when the first electrode is shorted to the second electrode by an electrically conductive element. In some cases, the projectile is an electrically conductive element.

In one or more instances of the aforementioned embodiments, the first gaming outfit includes: a helmet; and a sensor suit. In some such cases, the suit is communicably coupled to the helmet. In various cases, at least one of the sensor suit or the helmet is communicably coupled to the gun.

Yet other embodiments provide a live action game system that includes: a first gaming outfit, a second gaming outfit, a first gun, and a second gun. The first gaming outfit includes a processing circuit configured to: detect that a second player associated with the second gaming outfit is targeting a first player associated with the first gaming outfit to yield a player identification; detect an impact with the first gaming outfit to yield an impact identification; and determine a shot hit by the second player against the first player by a projectile propelled by the second gun based upon a combination of the player identification and the impact identification. In some instances of the aforementioned embodiments, the processing circuit is configured to detect that the second gun is aimed at the first player. In such instances, the player identification is a gun identification identifying the second gun.

In one or more instances of the aforementioned embodiments, the first gaming outfit includes: a helmet; and a sensor suit. In some such cases, the suit is communicably coupled to the helmet. In various cases, at least one of the sensor suit or the helmet is communicably coupled to the gun.

In various instances of the aforementioned embodiments, the processing circuit is further operable to detect a projectile release by the second gun to yield a projectile release indication; and wherein determining the shot hit by the second player against the first player by a projectile propelled by the second gun is based upon a combination of the gun identification, the impact identification, and the projectile release indication. In some instances of the aforementioned embodiments, the processing circuit is further operable to detect a range of the second gun to the first gaming outfit to yield a range indication; and wherein determining the shot hit by the second player against the first player by a projectile propelled by the second gun is based upon a combination of the gun identification, the impact identification, the projectile release indication, and the range indication. In one or more instances of the aforementioned embodiments, determining the shot hit by the second player against the first player by a projectile propelled by the second gun is based upon a combination of the gun identification, the impact identification, and a projectile release indication indicating a projectile release from the second gun. In various instances of the aforementioned embodiments, determining the shot hit by the second player against the first player by a projectile propelled by the second gun is based upon a combination of the gun identification, the impact identification, a projectile release indication indicating a projectile release from the second gun, and a range indication indicating a distance from the second gun to the first player.

In one or more instances of the aforementioned embodiments, the first gaming outfit includes: an impact detection pad configured to sense an impact by a projectile propelled from the second gun; and an optical decoder receiver configured to receive an optically modulated signal from the second gun, wherein the optically modulated signal includes an identification of the second gun. In some such instances, the impact detection pad is an electrical continuity-based impact pad including a first electrode and a second electrode, and wherein the impact detection pad is configured to signal an impact when the first electrode is shorted to the second electrode by an electrically conductive element. In various instances of the aforementioned embodiments, the projectile is an electrically conductive element.

Turning to FIG. 1a, a block diagram 100 shows various components used in an example game scenario. In particular, a number of players (e.g., a player 130, a player 140, and a player 150) are each equipped with a gaming outfit 180 and a gun 160 (player 13 with gaming outfit 180a and gun 160a, player 140 with gaming outfit 180b and gun 160b, and player 150 with gaming outfit 180c and gun 160c). Each of guns 160 and gaming outfits 180 are communicably coupled to a central server 120 via a communication network 110. In some cases, the communication coupling between guns 160, gaming outfits 180, and central server 120 is a WiFi coupling, a Bluetooth™ coupling, cellular radio coupling, or another wireless communication coupling as are known in the art. Where the game scenario is played in an arena, the arena may be equipped with a number of communication network gateways strategically positioned to assure reliable communication between gaming outfits 180, guns 160, and central server 120.

Gun 160 is designed to propel a projectile (not shown) along a path corresponding to the direction at which gun 160 is aimed. Further, gun 160 includes a range finder capable of estimating a range or distance from gun 160 to a target (in this case, player 150). Additionally, in some embodiments gun 160 transmits a directional communication 189 that is received at a location approximately corresponding to the direction at which gun 160 is aimed. In some such embodiments, directional communication 189 is an infrared light that is modulated to represent data indicating, but not limited to, the identification of gun 160, a range from gun 160 to a target (in this case, player 150), and/or an indication of when a shot is propelled by gun 160. A communication circuit (not shown) in gun 160a is capable of both transmitting/receiving information (represented as a dashed line 132) to/from central server 120. Similarly, a communication circuit (not shown) in gun 160b is capable of both transmitting/receiving information (represented as a dashed line 142) to/from central server 120, and a communication circuit (not shown) in gun 160c is capable of both transmitting/receiving information (represented as a dashed line 152) to/from central server 120. In some embodiments, the aforementioned communication circuits in guns 160 transmit gun identification, target range, a time stamped indication of a shot propelled, and/or other information to central server 120. In various embodiments, the aforementioned communication circuits in guns 160 receive display information including the location of other players, whether the other players are friend or foe, shot hit counts of gun 160 against other players, and shot hit counts against the player associated with the respective gun 160.

In some cases, gun 160 is intended to sound and feel like a firearm or to be a reasonable mimic thereof. In such cases, some recoil will occur simply because of the projectile leaving the muzzle of the gun at a defined velocity, but the mass of the projectile combined with the projectile velocity will not create a sufficient sensory experience for the player. Because of this, in some cases the gun is equipped with a force feedback mechanism to increase the sense of recoil. This force feedback mechanism may be, for example, a rotational motor moving a weight at variable velocities to create the feel of recoil. In addition to the functionality described above, the following lists some of the features of gun 160, some or all of which may be included in different embodiments:

- Air pressure operated or mechanically operated using an electric motor,
- WiFi and/or Bluetooth™ capable or have wiring between gun 160 and a sensory suit of gaming outfit 180 making it possible for gun 160 to directly connect and communicate with a gaming outfit 180 worn by a player associated with gun 160;
- Able to interface with a gaming outfit 180 or with a central database maintained in central server 120;
- Use the following technologies to target and fire upon an opponent:
  - RFID
  - Laser or light
  - Electromagnetic
  - Sound or optics
- Rate of fire may be adjustable
  - The intensity of fire (projectile velocity) may be adjustable (in some embodiments, gun 160 propel a projectile at between thirty (30) and two hundred (200) feet per second when measured at the muzzle of gun 160

Preclusion of propelling further projectiles for at least a defined period if the player associated with gun 160 incurs a shot hit against them or for other reason defined in a rule set for a particular game scenario;

Rechargeable with either additional electrical charge or air pressure charge;

Reloadable with additional projectiles;

Capable of interfacing with a mobile device such as, for example, a player's cellular telephone to allow for receiving and displaying targeting and game information from central server 120 or other gaming outfits 180 and/or guns 160;

Propel projectiles in various selectable modes including, but not limited to, fully automatic, bursty, semi-automatic, and/or manual load and single shot;

Receive software or hardware updates transmitted from central server 120, a gaming outfit 180, and/or another gun 160; and/or Display to tell the player how much ammo they have left and an optimal time to reload Gaming outfit 180 includes one or more pieces of equipment worn by a player during a game scenario. In one embodiment, gaming outfit 180 includes a sensory suit that is placed on the player body and may include, but is not limited to, a shirt, pants, and/or a one-piece jumpsuit. In various embodiments, gaming outfit 180 includes a helmet that is worn on the head of the player. In some cases, gaming outfit 180 includes both a sensory suit and a helmet. Based upon the disclosure provided herein, one of ordinary skill in the art will recognize a variety of wearable equipment that may be included in gaming outfit 180 in different embodiments.

In some embodiments where gaming outfit 180 includes both a sensory suit and a helmet, both the sensory suit and the helmet include one or more optical decoder receivers that are capable of receiving and decoding directional communication(s) 189 (examples shown in FIGS. 1*c*, 1*d*) from one or more guns 160 that are aimed at the player wearing gaming outfit 180. Further, the sensory suit and/or the helmet include one or more impact pads that are capable of detecting a physical impact with gaming outfit 180. Such impact pads are particularly designed to detect the impact of projectiles propelled from guns 160 that impact gaming outfit 180. A communication circuit (not shown) in gaming outfit 180*a* is capable of both transmitting/receiving information (represented as a dashed line 134) to/from central server 120. Similarly, a communication circuit (not shown) in gaming outfit 180*b* is capable of both transmitting/receiving information (represented as a dashed line 144) to/from central server 120, and a communication circuit (not shown) in gaming outfit 180*c* is capable of both transmitting/receiving information (represented as a dashed line 154) to/from central server 120. In some embodiments, the aforementioned communication circuits in gaming outfits 180 transmit, for example, location of the player wearing the respective gaming outfit 180, recorded shot hit information derived in part from sensing impacts at impact pads, time stamped indication of a shot propelled, range, and/or gun identification derived from decoding directional communication(s) 189. The location of the player wearing the respective gaming outfit 180 may be derived from a satellite positioning information where the game play is out doors or other locating technology incorporated in gaming outfit 180 when game play is indoors.

Gaming outfit 180 performs a variety of functions including, but not limited to, detecting and recording the impact of projectiles, providing some level of protection from the projectiles, detecting and recording information about guns 160 aimed at gaming outfit 180, and/or communication with the central server 120. In addition to the functionality described above, the following lists some of the features of gaming outfit 180, some or all of which may be included in different embodiments:

Impact detection by: capacitive or resistive touch sensors, electromagnetic sensing, RFID sensing where the suit includes a number of RFID readers and the projectiles are equipped with RFID slave circuits; light sensors; near field communication circuitry capable of communication between the player's gun and the suit; sound and/or optical sensors to measure angles or visually determine shooting: computer processor to operate timing algorithms to determine shot to impact ratios; and/or virtual sensing relying upon aim information from another player's gun along with relative location of the other player's gun and the player recording the impact.

A helmet which may include a speaker for communication with other players or with the business facility. The helmet may also include a visual display giving the player information about the game and their playing status.

Player Feedback by: feedback sensors such as lights or vibrators to inform a player of a hit and the location of the hit Impact areas may be plates fitted to the body Adjustable to allow for varying body sizes Rechargeable Receive software updates from central server 120, another suit 180 or a gun 160.

WiFi and/or Bluetooth capable or have wired capabilities

Interface with the player gun 160 and/or with central server 120 via one or both of wired or wireless communication network(s)

Record player biological/physiological measurements (heart rate, pulse ox, respiratory rate, etc.)

Differentiate between direct hits, glancing blows, or other false positives hits from other non-projectile impacts Contain impact foams such as Poron™ to protect the player Central server 120 may also receive location information identifying the location of one or more of players 130, 140, 150 from various sensors (not shown) distributed around a region of game play in which the players are co-located. Such sensors may include, but are not limited to, cameras, triangulation sensors, and/or radio frequency identification (RFID) readers. Based upon the disclosure provided herein, one of ordinary skill in the art will recognize a variety of sensors and sensor locations that may be used to gather information about players 130, 140, 150 within the region of game play. In some embodiments, central server 120 is responsible for processing player scores, shot hits and properly displaying credit and scores for each player. It may rely on WiFi, Bluetooth™ or other wireless or wired technologies to send or receive data.

In some embodiments, a game scenario is played out in an arena (not shown). Such an arena may be enclosed to define boundaries of the game scenario and for controlling the flight of propelled projectiles within an easily recoverable area. In some cases, the arena may have transparent walls allowing for spectators. In various cases, the arena may include grated floors with sufficiently small grating to avoid interference with player movement, but sufficiently large to allow recently fired projectiles to fall into a recovery mechanism that automatically transports the projectiles to one or more reload stations in the arena. When a player is out of projectiles, they can move to one of the reload stations where a gravity feed and/or vacuum system flows a large number of projectiles into the player's gun. The arena further includes various displays that may display real time game information based upon activity uploaded from one or more of the player suits within the arena. Further, the arena may include one or more cameras to record game play, follow players around, track players within the arena, track player suits, and/or calculate hits on players. The arena may include a variety of obstacles and/or locations of cover.

Figure 1B:
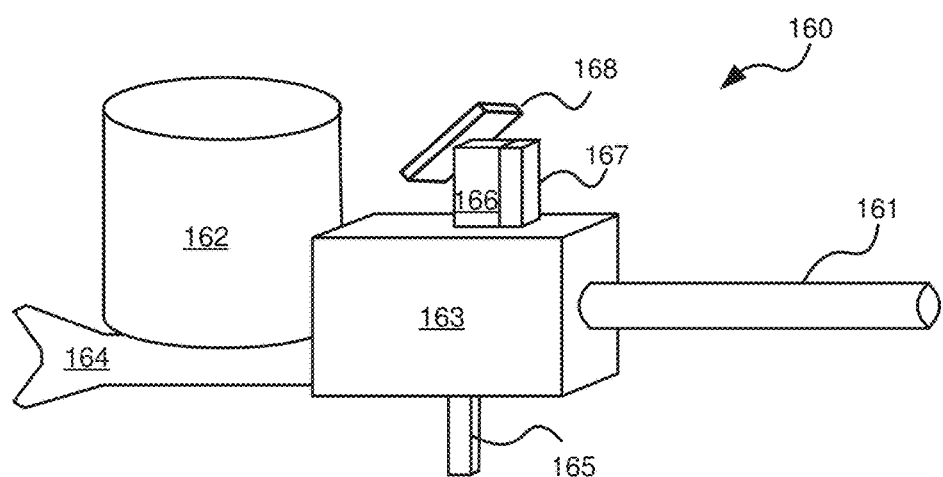
FIG. 1b shows a gun in accordance with one or more embodiments.

Turning to FIG. 1b, a gun 160 is shown that may be used in relation to various embodiments. As shown, gun 160 includes: a stock/handle 164 by which a player may grip and control gun 160, a magazine 162 that holds a number of projectiles (not shown); a propelling mechanism 163 that pulls a projectile from magazine 162 and propels it out a barrel 161 each time a trigger 165 is pulled (in a semi-automatic firing mode) or repeatedly as long as trigger 165 remains pulled (in an automatic mode); a range finder 166 capable of determining a distance from gun 160 to a target at which gun 160 is aimed; an optical modulation device 167 capable of transmitting an optically modulated signal at a distance greater than the effective firing range of gun 160; and a display, processing, and communication circuit 168 capable of wireless transmission of information from gun 160 to a recipient such as, but not limited to, central server 120, and wireless reception of information from a provider such as, but not limited to, central server 120.

Stock/handle 164 may be any apparatus that allows a user to hold and control gun 160. Based upon the disclosure provided herein, one of ordinary skill in the art will recognize a variety of stocks and/or handles that may be incorporated into gun 160 in accordance with different embodiments.

In some embodiments, magazine 162 is a cylinder that is open on the top allowing for quick reloading of projectiles. In some embodiments, gun 160 is taken to a reloading station and placed below a reservoir of projectiles that are then allowed to drop into magazine 162 until it is filled with projectiles. Based upon the disclosure provided herein, one of ordinary skill in the art will recognize a variety of magazines that may be used to hold projectiles to be propelled by gun 160.

In some embodiments, propelling mechanism 163 is an electrically powered mechanical throwing mechanism capable of propelling a projectile that is gravity fed from magazine 162. In some cases, the mechanical throwing mechanism includes two wheels separated by a distance approximately corresponding to a cross-section of a projectile. In such a system, a projectile is moved toward and between the two wheels. Each of the wheels are spinning in a direction such that the projectile is grabbed between the two wheels, accelerated to a velocity that corresponds to the rate at which the wheels are rotating, and propelled down barrel 161. In some embodiments, the projectiles are spherical projectiles similar to that discussed below in relation to FIG. 1h and leave the muzzle of barrel at approximately 100 feet per second. In other embodiments projectiles are shapes other than spheres including, but not limited to, a cylindrically shaped projectile.

Trigger 165 may be any device for controlling the flow of projectiles from magazine 162 and into propelling mechanism 163. In some embodiments, trigger 165 controls a mechanical gate (not shown) between magazine 162 and propelling mechanism 163. In some cases, pulling trigger 165 causes a single projectile to move from magazine 162 to propelling mechanism 163 (semi-automatic shot mode). In other cases, pulling trigger 165 causes a series of projectiles to feed from magazine 162 to propelling mechanism 163 that continues until trigger 165 is released (automatic shot mode). In yet other cases, pulling trigger causes a defined number of projectiles (e.g., 3) to feed from magazine 162 to propelling mechanism 163 on each pull (bursty shot mode).

Range finder 166 is any device that is capable of determining a distance from gun 160 to a target at which gun 160 is aimed. Based upon the disclosure provided herein, one of ordinary skill in the art will recognize a variety of range finding devices and/or technologies that may be used in relation to different embodiments. Range finder 166 provides the determined range to display, processing, and communication circuit 168 via a wired connection.

Optical modulation device 167 modulates an infrared light source in accordance with data received from display, processing, and communication circuit 168. Optical modulation device 167 selectively gates an infrared light source to produce an optical signal unique to gun 160. In one embodiment, optical modulation device 167 sends the following data package as a modulated light stream directed in the same direction as barrel 161 as follows:

| Synchronization Header | Gun ID | End of Packet indicator |
| --- | --- | --- |

The synchronization header is a seven-bit series of alternating ones (light received) and zeroes (light blocked) that establishes the length of bit periods for synchronizing to the optical signal from gun 160. The gun identification field is a five-bit series that starts with two-bit periods of ones followed by a three-bit period with a combination of ones and zeroes unique to gun 160 that is transmitting the optical signal. The end of packet indicator is five-bit periods of ones immediately following the gun identification field.

In another embodiment, optical modulation device 167 sends the following data package as a modulated light stream directed in the same direction as barrel 161 as follows:

| Synchronization Header | Gun ID | Shot Fired | End of Packet indicator |
| --- | --- | --- | --- |

The synchronization header is a seven-bit series of alternating ones and zeroes that establishes the length of bit periods for synchronizing to the optical signal from optical modulation device 167 by a receiving decoder. The gun identification field is a five-bit series that starts with two-bit periods of ones followed by a three-bit period with a combination of ones and zeroes unique to gun 160 that is transmitting the optical signal. The shot fired field is a two-bit period of ones indicating a shot was fired or two-bit periods of zeroes indicating a shot was not fired. The shot fired field indicates a shot is fired each time a projectile is released by propelling mechanism 163. The end of packet indicator is five-bit periods of ones immediately following the shot fired field.

In another embodiment, optical modulation device 167 sends the following data package as a modulated light stream directed in the same direction as barrel 161 as follows:

| Synchronization Header | Gun ID | Shot Fired Range | End of Packet indicator |
| --- | --- | --- | --- |

The synchronization header is a seven-bit series of alternating ones and zeroes that establishes the length of bit periods for synchronizing to the optical signal from gun 160. The gun identification field is a five-bit series that starts with two-bit periods of ones followed by a three-bit period with a combination of ones and zeroes unique to gun 160 that is transmitting the optical signal. The shot fired field is a two-bit period of ones indicating a shot was fired or two-bit periods of zeroes indicating a shot was not fired. The shot fired field indicates a shot is fired each time a projectile is released by propelling mechanism 163. The range field is a five-bit series that starts with two-bit periods of ones followed by a three-bit period with a combination of ones and zeroes indicating the range provided from range finder 166 via display, processing, and communication circuit 168. The end of packet indicator is five-bit periods of ones immediately following the range field.

Display, processing, and communication circuit 168 includes a wireless transceiver capable of wirelessly communicating to/from central server 120 and/or to/from other guns 160 or gaming outfits 180. Display, processing, and communication circuit 168 includes a processor, a display, and software or firmware that is executed by processor in some cases to determine shot hits, to control communications to/from gun 160, and to control data to be provided via the display.

In some cases, shot hit information (information about identified shot hits) is received by the wireless transceiver of display, processing, and communication circuit 168 is processed by the processor of display, processing, and communication circuit 168 and displayed by the display of display, processing, and communication circuit 168. This shot hit information may be received, for example, from central server 120 or from a suit 180 worn by either the player associated with gun 160 or from a suit 160 worn by another player. The shot hit information may be received along with other information. This other score information may include, for example, the number of shots recorded against the player associated with gun 160 and/or the overall number of shot hits recorded by the player associated with gun 160. The received information may be displayed via the display of display, processing, and communication circuit 168. Further, as more fully discussed below, where the location of the various players in the game is monitored, the other information transmitted from central server 120 to gun 160 may include the identity and location of other players and where relevant an indication of whether each of the other players is on the team of the player associated with gun 160 receiving the information. This information may similarly be displayed via display of display, processing, and communication circuit 168 of gun 160 and serves to further immerse the player in the particular game scenario being played.

Figure 1E:
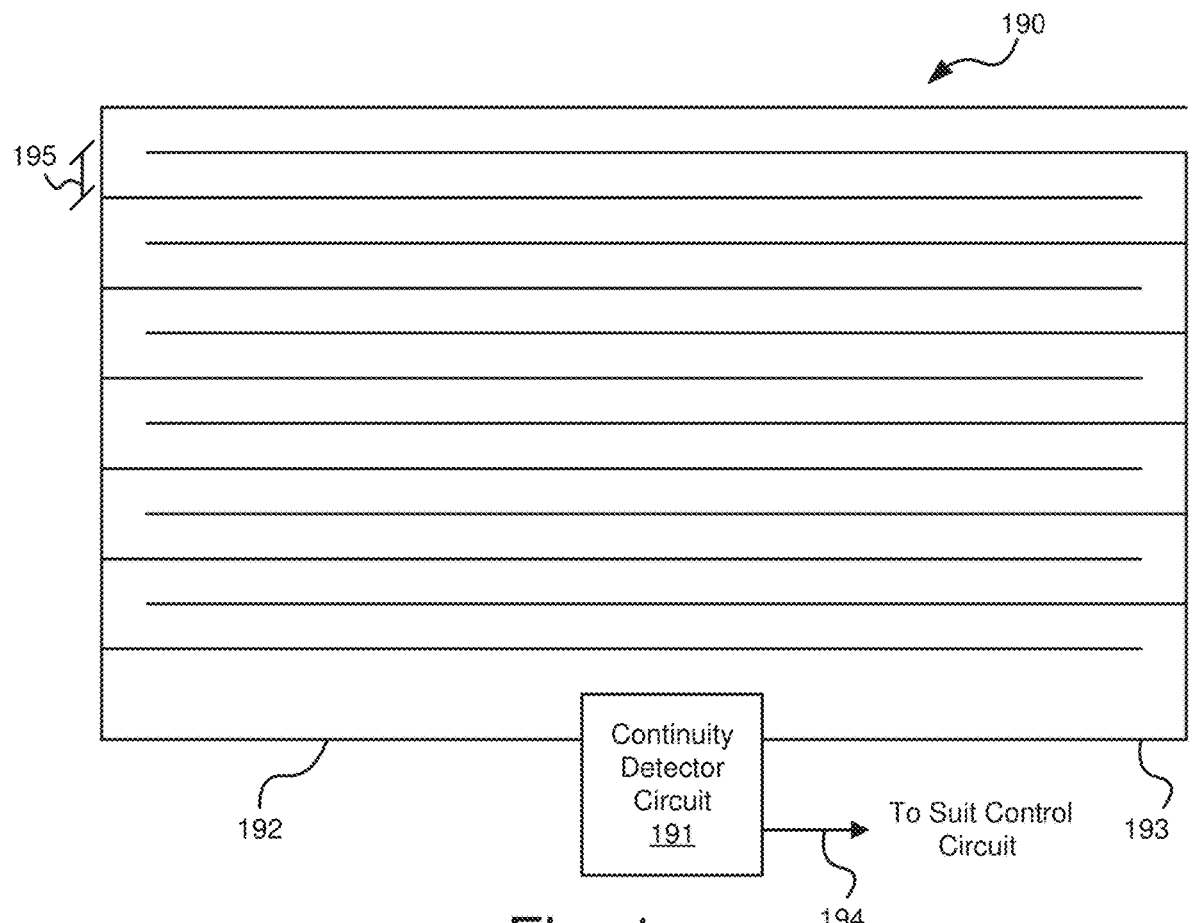
FIGS. 1c-1e show a sensor suit in accordance with various embodiments.
Figure 1C:
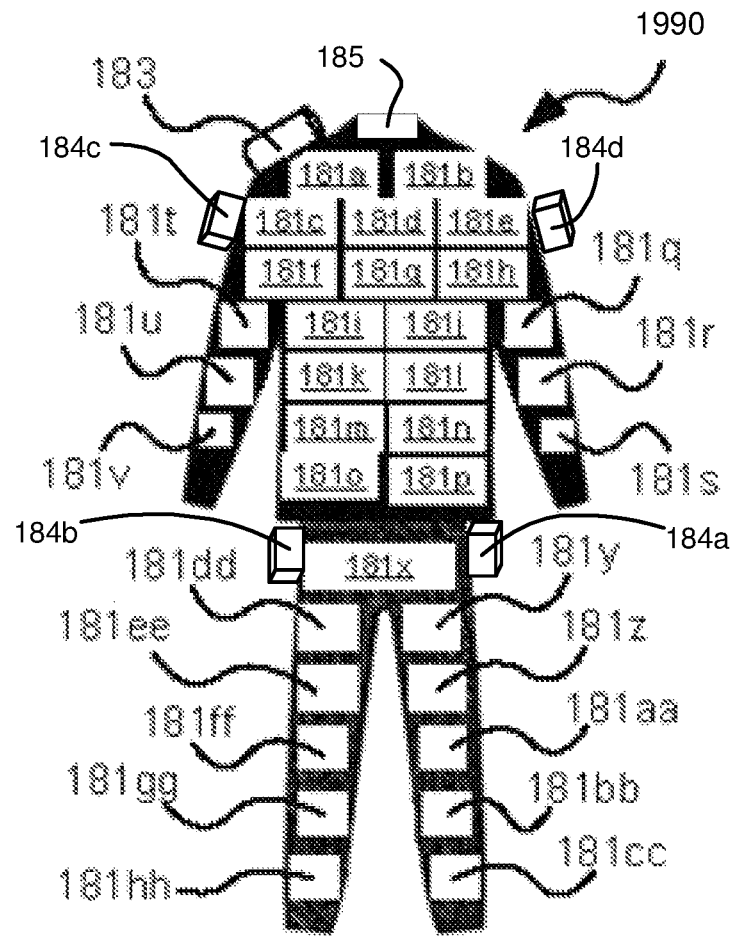

Turning to FIG. 1c, a sensor suit 1990 is shown that may be used in relation to one or more embodiments. Sensor suit 1990 includes a number of impact pads 181 (181a, 181b. 181c, 181d. 181e, 181f, 181g, 181h. 181i, 181j, 181k, 181l, 181m, 181n, 181n, 181o, 181p, 181q, 181r, 181s, 181t, 181u, 181v, 181w, 181x, 181y, 181z. 181aa. 181bb, 181cc, 181dd, 181ee, 181ff, 181gg, 181hh). Each of impact pads 181 is attached to a different location on sensor suit 1990, and is capable of detecting the impact of a projectile against sensor suit 1990 at the respective location covered by the impact pad. When an impact is detected, the respective impact pad 180 that detected the impact communicates an electronic message to a suit signal processing circuit 183.

In addition, sensor suit 1990 includes a number of optical decoder receivers 184 (184a, 184b, 184c, 184d) that are capable of receiving optical data signals sent from one or more guns 160 (or helmets 1900) when they are aimed or otherwise directed at sensor suit 1990. The optical data signals include an indication of which gun 160 (or helmet 1900) is pointed at sensor suit 1990. In some cases, the optical data signals may further include an indication of a shot fired by a gun 160 aimed at sensor suit 1990 and/or a distance of gun 160 (or helmet 1900) to sensor suit 1990.

As discussed above, guns 160 or helmet 1900 each send an optical signal unique to the particular gun or helmet. In one embodiment, guns 160 (or helmet 1900) each send the following data package as a modulated light stream that is detected by one or more of optical decoder receivers 184:

| Synchronization Header | Gun ID | End of Packet indicator |
| --- | --- | --- |

The synchronization header is a seven-bit series of alternating ones (light received) and zeroes (light blocked) that establishes the length of bit periods for synchronizing to the optical signal from gun 160. The gun identification field (or helmet identification field) is a five-bit series that starts with two-bit periods of ones followed by a three-bit period with a combination of ones and zeroes unique to gun 160 that is transmitting the optical signal. The end of packet indicator is five-bit periods of ones immediately following the gun identification field.

In another embodiment, guns 160 each send the following data package as a modulated light stream that is detected by one or more of optical decoder receivers 184:

| Synchronization Header | Gun ID | Shot Fired | End of Packet indicator |
| --- | --- | --- | --- |

The synchronization header is a seven-bit series of alternating ones and zeroes that establishes the length of bit periods for synchronizing to the optical signal from gun 160. The gun identification field is a five-bit series that starts with two-bit periods of ones followed by a three bit period with a combination of ones and zeroes unique to gun 160 that is transmitting the optical signal. The shot fired field is a two-bit period of ones indicating a shot was fired or two-bit periods of zeroes indicating a shot was not fired. The end of packet indicator is five-bit periods of ones immediately following the shot fired field.

In another embodiment, guns 160 each send the following data package as a modulated light stream that is detected by one or more of optical decoder receivers 184:

| Synchronization Header | Gun ID | Shot Fixed Range | End of Packet indicator |
| --- | --- | --- | --- |

The synchronization header is a seven-bit series of alternating ones and zeroes that establishes the length of bit periods for synchronizing to the optical signal from gun 160. The gun identification field is a five-bit series that starts with two-bit periods of ones followed by a three bit period with a combination of ones and zeroes unique to gun 160 that is transmitting the optical signal. The shot fired field is a two-bit period of ones indicating a shot was fired or two-bit periods of zeroes indicating a shot was not fired. The range field is a five-bit series that starts with two-bit periods of ones followed by a three-bit period with a combination of ones and zeroes indicating a range from gun 160 to suit as measured by gun 160. The end of packet indicator is five-bit periods of ones immediately following the range field.

One or more of optical decoder receivers 184 that received the optical signal from gun 160 (or helmet 1900) first synchronize to the received signal using the synchronization header, and then proceeds to decode the information in the following fields. The decoded information is then provided by one or more of optical decoder receivers 184 to suit signal processing circuit 183.

In some cases, four optical decoder receivers 184 are distributed over sensor suit 1990, however, one of ordinary skill in the art will recognize a variety of numbers of optical receivers and/or locations of the optical receivers that may be used to assure that guns 160 (or helmets 1900) aimed or otherwise directed at sensor suit 1990 are accurately detected and identified. For example, in another embodiment, each impact pad 181 includes optical decoder receiver 184 incorporated therewith, and thus able to discern gun(s) 160 (or helmet(s) 1900) that are aimed at the particular impact pad 181.

Sensor suit 1990 further includes a light emitting diode (LED) pack 185 that lights as a solid light (i.e., a non-flashing light pattern) or as a flashing light pattern depending upon the particular situation. For example, suit signal processing circuit 183 signals LED pack 185 to light in a solid pattern when a shot hit is recorded. This affords a shooter of gun 160 and the wearer of sensor suit 1990 a manifestation of a shot hit. In contrast, suit signal processing circuit 183 signals LED pack 185 to light in a flashing pattern when a shot hit is recorded, and that the recorded shot hit resulted in elimination of the player wearing sensor suit 1990 from an ongoing game. This affords a shooter of gun 160 and the wearer of sensor suit 1990 a manifestation of a shot hit and elimination of the player from the game. Based upon the disclosure provided herein, one of ordinary skill in the art will recognize a variety of colors and/or flashing patterns that may be used to communicate different information via LED pack 185.

Figure 1F:
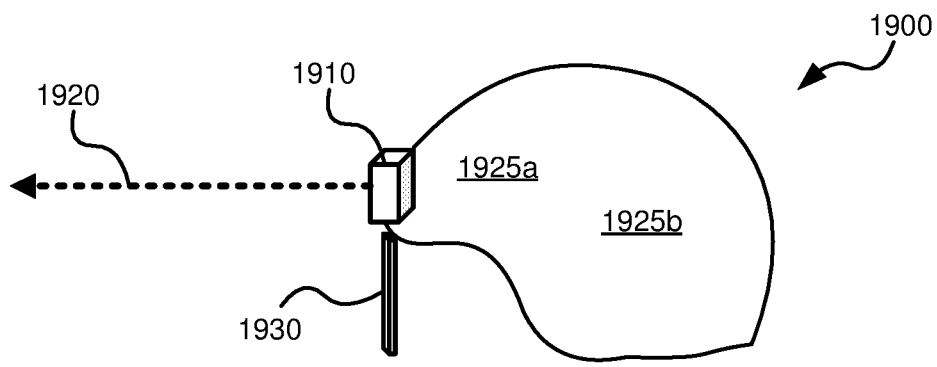
FIG. 1f-1g show a sensor helmet in accordance with one or more embodiments.
Figure 1D:
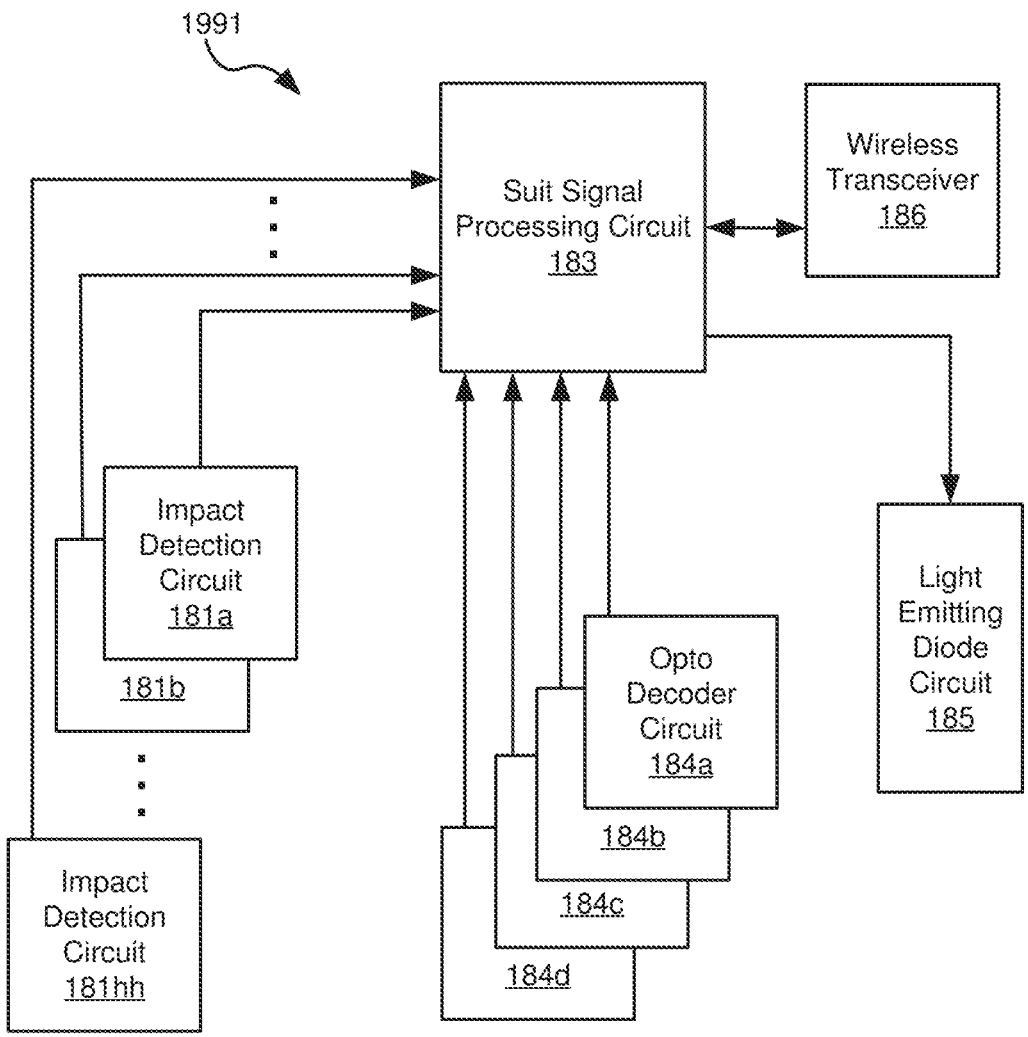

Turning to FIG. 1d, a block diagram 1991 of sensor suit 1990 is shown. As shown, a number of impact detection circuits (each incorporated in a respective one of impact pads 181a-181hh) that are responsible for detecting an impact with the respective impact pads 181. The occurrence of an impact is communicated to suit signal processing circuit 183 by a wired input. Additionally, a number of opto-decoder circuits (each incorporated in a respective one of optical decoder receivers 184) that are responsible for receiving a modulated optical signal from guns 160 (or helmets 1900), decoding the respective fields of the signal. The decoded information is then provided via respective wired inputs to suit signal processing circuit 183. A LED circuit (incorporated in LED pack 185) controls the lighting produced based upon a wired input received from suit signal processing circuit 183. A wireless transceiver 186 receives outputs from suit signal processing circuit 183 and wirelessly transmits the received information to a central server 120 where a central processing is performed or to other wireless recipients (other gaming outfits 180 and/or guns 160) where decentralized processing is used.

In some embodiments, suit signal processing circuit 183 determines whether a shot hit was recorded and from which gun 160 (or associated player) the shot hit was received. In such cases, suit signal processing circuit 183 applies a multi-data point algorithm to define a shot hit. The algorithm is designed to avoid indicating a shot hit based upon impact alone where, for example, the impact may have occurred when a player wearing sensor suit 1990 runs into a feature in the game. In some embodiments, a shot hit is based upon a combination of an impact indicated by an impact detection circuit of an impact pad 181 and reception of an indication of a particular gun 160 from a decoded gun identification. The following pseudo-code represents one embodiment for determining a shot hit by suit signal processing circuit 183:

```
If (impact indicated && gun identified){
    Indicate a shot hit by the gun associated with the gun
        identification)}
Else{
    Indicate no shot hit}
```

The aforementioned algorithm avoids spurious indications of shot hit based upon impact detection alone. The algorithm may be modified to use identification information of a player's helmet in place of or in addition to the gun identification. Further, the aforementioned algorithm identifies which player is credited with the shot hit.

Other embodiments further refine indication of shot hits by further considering a shot fired by an identified gun. The following pseudo-code represents another embodiment for determining a shot hit by suit signal processing circuit 183:

```
If (impact indicated && gun identified){
    If(shot fired by the identified gun){
        Indicate a shot hit by the gun associated with the gun
            identification}
    Else{
        Indicate no shot hit}
Else{
    Indicate no shot hit}
```

The aforementioned algorithm further limits spurious indications of shot hit based upon impact detection alone. The algorithm may be modified to use identification information of a player's helmet in place of or in addition to the gun identification, and/or to use range information generated by the player's helmet in place of or in addition to the same information from the player's gun. Further, the aforementioned algorithm identifies which player is credited with the shot hit.

Yet other embodiments further refine indication of shot hits by further considering a range of the identified gun. The following pseudo-code represents another embodiment for determining a shot hit by suit signal processing circuit 183:

```
If (impact indicated && gun identified){
    If(shot fired by the identified gun && range of the
        identified gun available){
        calculate time from shot fired by the identified gun to
            impact indicated;
        divide range of the identified gun by the calculated
            time to yield velocity;
        If(calculated velocity is within window of the
            expected projectile velocity){
            Indicate a shot hit by the gun associated with the
                gun
                identification}
        Else{
            Indicate no shot hit}
    Else{
        Indicate no shot hit}
Else{
    Indicate no shot hit}
```

The aforementioned algorithm further limits spurious indications of shot hit based upon impact detection and shot fired alone. The algorithm may be modified to use identification information of a player's helmet in place of or in addition to the gun identification, and/or to use range information generated by the player's helmet in place of or in addition to the same information from the player's gun. Further, the aforementioned algorithm is able to discern which gun was responsible for a particular impact where two or more guns are identified and indicate a shot fired where the distance of each of the guns from the suit registering the impact is different.

In some cases, such shot hit information is transmitted to central server 120. As mentioned above, such shot hit information may be transmitted from central server 120 to a gun 160 (or associated player) that was responsible for the identified shot hit, and the transmission may include other score information relevant to the player associated with the respective gun 160. This other score information may include, for example, the number of shot hots recorded against the player and/or the overall number of shot hits recorded by the player. The transmitted information may be displayed via display 168 on gun 160. Further, as more fully discussed below, where the location of the various players in the game is monitored, the other information transmitted from central server 120 to gun 160 may include the identity and location of other players and where relevant an indication of whether each of the other players is on the team of the player associated with gun 160 receiving the information. This information may similarly be displayed via display 168 of gun 160 and serves to further immerse the player in the particular game scenario being played.

It is noted that while the aforementioned embodiment is described as identifying a shot hit and indicating which gun was responsible for the shot hit, in other embodiments such determination may be made by central server 120. In such a case, suit signal processing circuit 183 transmits impact detection information and gun identification information to central server 120 via wireless transceiver 186. Similarly, each of guns 160 transmits its gun identification, shot fired, and range to central server 120 (and/or helmets 1900 transmitting similar information). In such a case, central server 120 combines the information received from guns 160 (and/or helmets 1900) and sensory suits 1990 to determine shot hits using one or more of the aforementioned algorithms, and reports any shot hit information back to respective guns 160, helmets 1900, and/or sensory suits 1990.

Turning to FIG. 1e, one implementation of an impact pad 190 is shown in accordance with some embodiments. In this case, impact pad 190 is an electrical continuity-based impact pad. Based upon the disclosure provided herein, one of ordinary skill in the art will recognize a variety of other implementations of impact pads that are capable of discerning impact from a projectile upon the pad in accordance with other embodiments. Such other implementations include, but are not limited to, capacitance-based impact pads capable of discerning impact from a projectile based upon a change in capacitance when a projectile comes into contact with the impact pad. One implementation of such a capacitance-based impact pad involves wrapping a compressible center material with commercially available Faraday fabric. Capacitance between Faraday fabric on opposite sides of the compressible center material is measured in a number of different circumstances (e.g., without an impact, and upon an impact), and the difference in the capacitance is used to discern whether an impact has occurred.

The electrical continuity-based impact detection of impact pad 190 relies upon two electrodes 192, 193 that each extend over the surface of a material, and are arranged such that there is a consistent distance 195 between the electrodes 192, 193 across the material surface. As shown, this may be done by interlacing electrode 192 with electrode 193 at a distance of 195 as shown in FIG. 1e.

In operation, a continuity detector circuit 191 applies a small charge to electrode 192. When an electrically conductive material is placed such that it contacts both electrode 192 and electrode 193 at the same time, a closed circuit is made between electrode 192 and electrode 193. In some embodiments, the electrically conductive material connecting electrode 192 to electrode 193 is an electrically conductive projectile that contacts impact pad 190. An example of such an electrically conductive projectile is discussed below in relation to FIG. 1h. The closed circuit resulting from contact connecting electrode 192 and electrode 193 allows the charge placed on electrode 192 to be sensed on electrode 193. Continuity detector circuit 191 senses electrode 193, and when a charge is detected asserts a likely shot hit output 194 that is provided to suit signal processing circuit 183 discussed above in relation to FIGS. 1c, 1d. In some cases, continuity detector circuit 191 may include some level of filtering to avoid spurious impact detection. Such filtering may include, but is not limited to, requiring a certain level of charge detection on electrode 193 and/or a certain duration of charge detection on electrode 193. Based upon the disclosure provided herein, one of ordinary skill in the art will recognize a variety of filtering approaches that may be implemented in continuity detector circuit 191 to improve the accuracy of impact detection by impact pad 190.

To operate properly, the previously described continuity-based impact detection pad relies upon an electrically conductive projectile to short electrode 192 to electrode 193. In other embodiments, it may be desirable to implement an electrical continuity-based impact pad that does not require an electrically conductive projectile, but rather can sense the impact of a non-electrically conductive projectile such as, for example, an uncoated foam projectile. Such a pad can be constructed by forming an impact pad with a first surface separated from a second surface by a deformable amount. This may be done, for example by creating an impact pad that is a dielectric-filled (e.g., air-filled) pillow with sufficient dielectric to keep the first surface and second surface separated in a static condition, but with insufficient air to keep the first surface from contacting the second surface when impacted by a projectile. The surfaces of the impact pad would have sufficient memory to return to a separated state (i.e., the static state) shortly after impact by a projectile. In such a design, electrodes are formed on one surface of an impact pad. The opposite side of the impact pad (e.g., the inside of sensor suit 1990 where the electrodes are on the outside of sensor suit 1990, or the outside of sensor suit 1990 where the electrodes are on the inside of sensor suit 1990) is made of an electrically conductive material. A charge is placed on the electrodes and when a projectile impacts the impact pad the first surface and second surface are forced together shorting the electrodes to the conductive material on the opposite surface. This short condition is detected and identified as a likely shot hit.

Turning to FIG. 1f, a sensor helmet 1900 is shown that may be included as part of gaming outfit 180 in some embodiments. Helmet 1900 is designed to be worn on the head of a player, and includes: impact pads 1925 (i.e., an impact pad 1925a, and an impact pad 1925b), a display, processing, and communication circuit 1930, and a range finder and optical modulation device 1910. Impact pads 1925 may be implemented similar to impact pads 181 discussed above. Display, processing, and communication circuit 1930 may perform a subset of the functions of display, processing, and communication circuit 1168 discussed above. As a display, display, processing, and communication circuit 1930 hangs down from helmet 1900 such that it is in the field of vision of the player without blocking the player's entire vision. In some cases, display, processing, and communication circuit 1930 hangs down from helmet 1900 in front of one of the player's eyes, but without blocking the player's other eye. In some cases, display, processing, and communication circuit 1930 is movable so that it can be flipped up out of the line of the players sight.

Range finder and optical modulation device 1910 performs a subset of the functions performed by range finder 166 and optical modulation device 167 including: identifying a range from helmet 1900 to an object being looked at by the player wearing helmet 1900, and transmitting an optically modulated signal 1920 at a distance greater than the effective firing range of a gun 160 associated with the player wearing helmet 1900. The optically modulated signal 1920 may include a subset or all of information discussed above in relation to gun 160 and is decodable by a sensory 1990 or helmet 1900 of another player. In some cases, information from optically modulated signal 1920 may be used in place of or in addition to information provided from gun 160. As such, the information is useful in the situation where gun 160 is used for a long "loft" shot where gun 160 is not aimed directly at the target, but rather is aimed at a raised angle to allow the projectile to descend onto the desired target. In such a case, optical information 1920 from helmet can be used in place of similar optical information from gun 160 that is no longer visible to a target's gaming outfit 180 as the player's vision (unlike the aim of gun 160) remains directed at the target. Based upon the disclosure provided herein, one of ordinary skill in the art will understand a variety of uses of information derived from helmet 1900, and in some cases to move some of the functions from gun 160 to helmet 1900. In some cases, display, processing, and communication circuit 1930 is wireless connected to gun 160 of the player to allow for a consolidation of information from gun 160 and helmet 1900 into a single optical signal, or to transmit two identical optical signals with one from gun 160 and the other from helmet 1900 allowing a receiving gaming outfit 180 to take get the information from at least one of the sources.

Figure 1H:
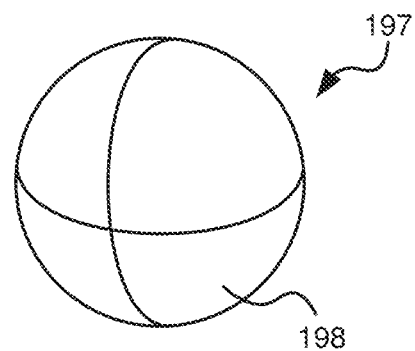
FIG. 1h shows a projectile in accordance with some embodiments.
Figure 1G:
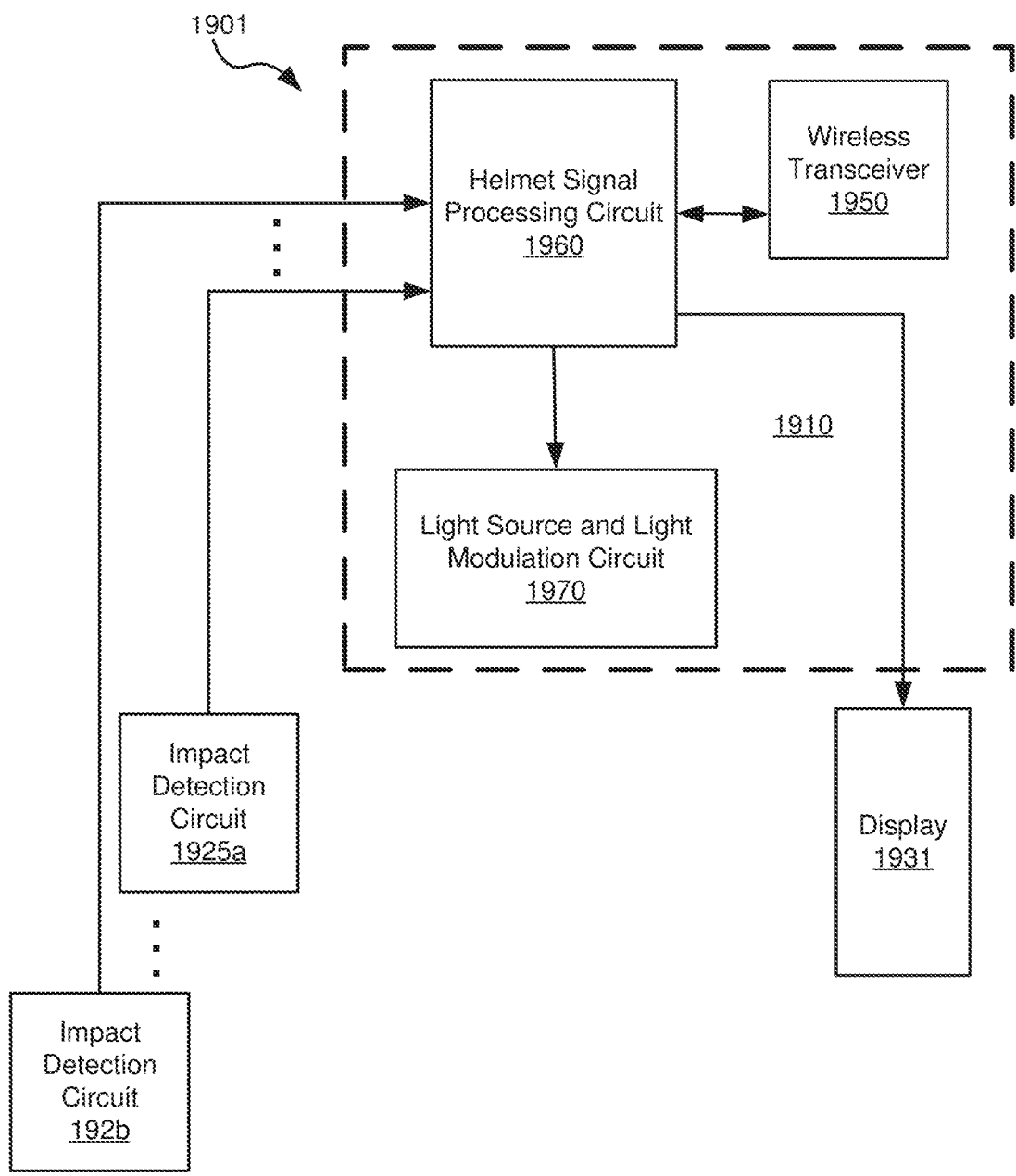

Turning to FIG. 1g, a block diagram 1901 of sensor helmet 1900 1900 is shown. As shown, a number of impact detection circuits (each incorporated in a respective one of impact pads 1925a-1925b) that are responsible for detecting an impact with the respective impact pads 1925. The occurrence of an impact is communicated to helmet signal processing circuit 1960 by a wired input.

A light source and light modulation circuit 1970 modulates a light source to communicate information provided from helmet signal processing circuit 1960. The light source may be an infrared light source and the modulation may create a message packet similar to that discussed above in relation to gun 160 that is transmitted as optically modulated signal 1920.

Helmet signal processing circuit 1960 provides and receives information via a wireless transceiver 1950 that may be part of display, processing, and communication circuit 1930, and helmet signal processing circuit 1960 provides display information to display 1931 that also display, processing, and communication circuit 1930. The information provided to display 1931 may be similar to that discussed above in relation to gun 160 or below in relation to displays.

In some cases, helmet 1900 is a slave of sensory suit 1990. In such cases, raw information gathered from helmet is transferred by wireless transceiver 1950 for processing in sensory suit 1990. In various cases, wireless transceiver is a Bluetooth™ transceiver. In some cases, the connection between helmet 1900 and sensory suit 1990 is a wired connection in which case wireless transceiver 1950 is replaced with a wired interface. Where helmet 1900 is a slave of sensory suit 1990, all information provided by display 1931 may be provided to helmet signal processing circuit 1960 from sensory suit 1990 and all information transmitted as optical signal 1925 is provided to helmet signal processing circuit 1960 from sensory suit 1990.

Turning to FIG. 1h, a projectile 197 that is shown in accordance with some embodiments. Projectile 197 is spherical with a diameter 199. Based upon the disclosure provided herein, one of ordinary skill in the art will recognize that other shapes for projectiles may be used in relation to different embodiments including, but not limited to, an elongated arrow or dart shaped projectile. Projectile 197 may be made of a dense foam material that has enough mass to allow it to travel through over thirty (30) feet of atmosphere with an initial velocity of one hundred (100) feet per second without significant deviation from the direction which the projectile is initially aimed. Further, the density of the foam is not so dense as to create harm to an individual at which the projectile is aimed. Based upon the disclosure provided herein, one of ordinary skill in the art will recognize a range or materials that will allow for desired projectile operation in differing game scenarios.

In some embodiments where an electrical continuity-based impact pad is used (e.g., impact pad 190 described above in relation to FIG. 1e, at least a portion of an outer surface 198 of projectile 197 is covered with an electrically conductive material. As such, when projectile 197 impacts the electrical continuity-based impact pad, the electrically conducive material on outer surface 198 closes a circuit between two otherwise electrically isolated contact lines. As previously discussed in relation to FIG. 1e, closing the circuit is detected and the occurrence of a likely shot hit is recorded by the electrical continuity-based impact pad. A combination of diameter 199, distance 195 (shown in FIG. 1e) between electrically isolated contact lines, and movement of suit material (e.g., how the suit material conforms to outer surface 198 upon impact of the projectile) is selected to assure a detectable impact when contact is made between projectile 197 and the electrical continuity-based impact pad. Based upon the disclosure provided herein, one of ordinary skill in the art will recognize a variety of combinations of diameter 199, distance 195, and movement of suit material that may be used in relation to different embodiments.

Figure 2A:
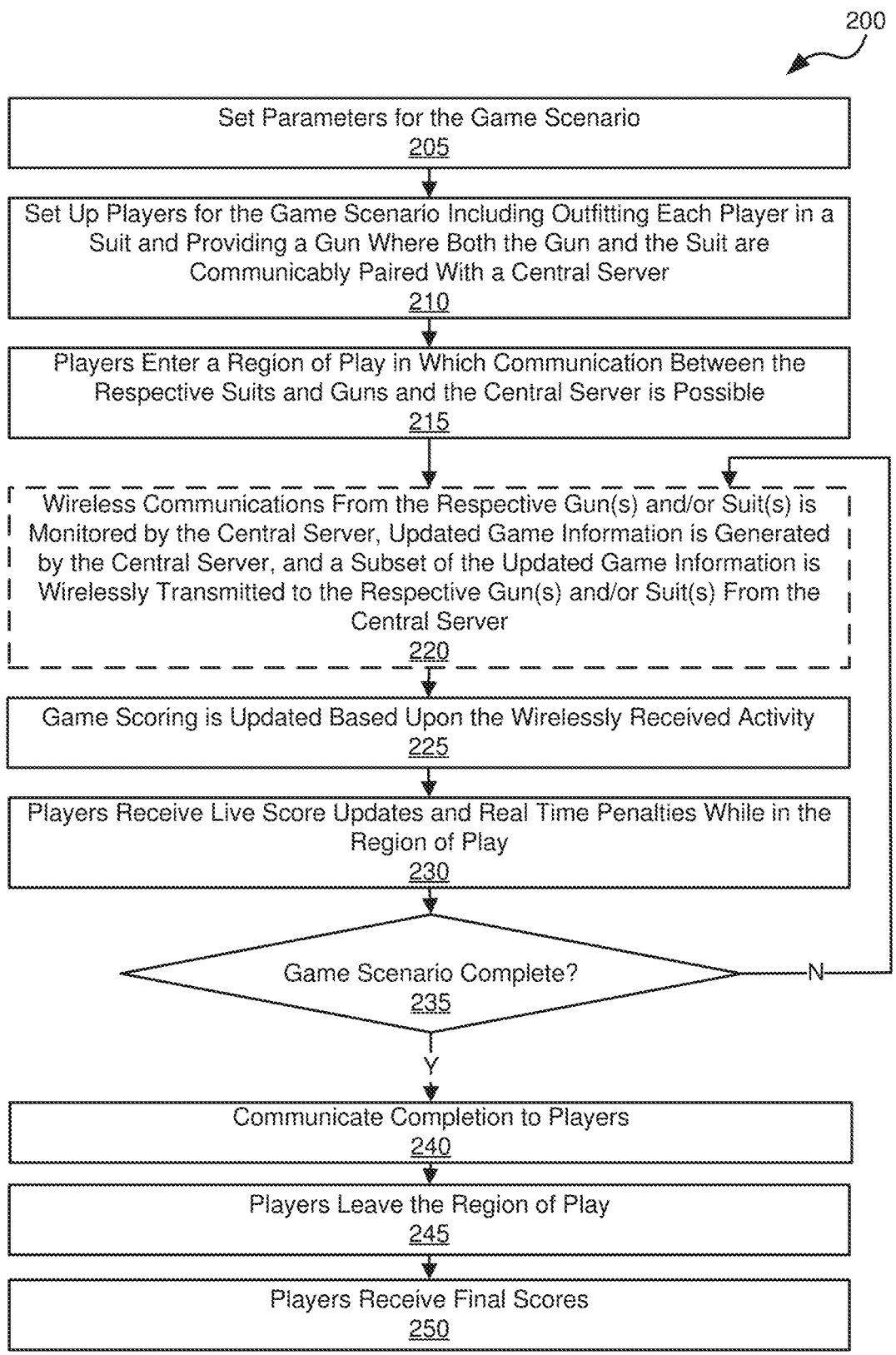
FIGS. 2a-2b are flow diagrams showing a gaming process in accordance with various embodiments.

Turning to FIG. 2a, a flow diagram 200 shows a gaming process in accordance with various embodiments. Following flow diagram 200 and applying the scenario to the system elements set forth in FIGS. 1a-1h above, parameters of a game scenario are set (block 205). It is noted that the process of flow diagram 200 can be applied to a number of different combinations of system elements in addition to those described in relation to FIGS. 1a-1h, and that reference to the system elements of FIGS. 1a-1h is merely illustrative of one embodiment, and not otherwise limiting. For example, the process of flow diagram 200 is discussed as using only optical signal data received from gun 160, but other embodiments may use optical signal data received from helmet 1900 either in place of that received from gun 160 or in addition to that received from gun 160. The aforementioned parameters may include, but are not limited to, a maximum rate of fire for guns 160, a velocity of fire for guns 160, location within the arena where guns 160 will either not operate and/or locations within the arena where shot hits will not be counted by gaming outfits 180 (i.e., safe zones where, for example, guns 160 may be reloaded with projectiles 197), number of shot hits a player may sustain before being required to visit a safe zone for a defined period (i.e., a recovery period), points given to a player 130, 140, 150 for making a shot hit, points taken when a player 130, 140, 150 sustains a shot hit, amount of time for the game scenario, and the like. This information can be set using a user interface of central server 120, with the effects of the instructions being downloaded to a combination gun 160 and suit 180 for each player 130, 140, 150.

The effect of loading the game scenario is to cause gaming outfit 180 and/or gun 160 to operate in accordance with the game scenario. For example, loading gun 160 with a game scenario limited to semi-automatic propelling of projectiles will eliminate any automatic or bursty functionality supported by gun 160. As another example, loading gun 160 with a game scenario limited to a specific velocity at which projectiles are propelled from gun 160 will cause the propelling mechanism of gun 160 to propel projectiles at the defined rate. In some cases, loading the game scenario to gun 160 and/or gaming outfit 180 engages gaming outfit 180 and/or gun 160 in maintaining the rules of the game scenario. For example, by defining safe zones will cause a suit not to recognize shot hits received while within a safe zone and/or may penalize a player that shoots into a safe zone. Based upon the disclosure provided herein, one of ordinary skill in the art will recognize a variety of game parameters that may be employed in relation to different game scenarios, and/or a variety of modifications of gaming outfit 180 operations and/or gun 160 operations that may be implemented based upon the defined parameters.

Each of the players in the game scenario are set-up (block 210). This includes fitting each of the players 130, 140, 150 with a gaming outfit 180, providing each of the players 130, 140, 150 with a gun 160, and communicably coupling gun 160 and gaming outfit 180 to a central server 120.

The outfitted players 130, 140, 150 enter an arena or other region of play (block 215). The region of play may be any region where at least intermittent communication between various elements of the game (e.g., guns 160, gaming outfits 180, and/or central server 120) is possible. The level of communication is sufficient where it supports the functions required for the selected game scenario.

As the players engage in game activity (including, for example, aiming guns 160 at other players 130, 140, 150 and propelling projectiles at other players 130, 140, 150), wireless communications form respective guns 160 and gaming outfits 180 is monitored by central server 120 (block 220). Central server 120 updates game information and transmits a subset of the game information to selected ones of gaming outfits 180 and/or guns 160. Block 220 is shown in dashed lines as some of the functionality of the block is discussed in relation to later Figs.

As an example, gaming outfits 180 report shot hits to central server 120 and central server 120 updates game scoring based upon the shot hits and/or other received activity (block 225). This may include increasing the score of a player 130, 140, 150 attributed with a shot hit and/or decreasing the score of a player 130, 140, 150 that received the shot hit. A subset of the updated game scoring is then transmitted to players 130, 140, 150 to which the scoring is relevant (block 230). This information may be displayed via a display on gun 160, a display included as part of gaming outfit 180, or another portable electronic device (e.g., a cell phone) of a player 130, 140,150. The processes of blocks 220-230 continue until a game scenario is completed (block 235). As an example, a game scenario may complete after a defined time period.

Once the game scenario completes (block 235), central server 120 communicates the completion to players 130, 140, 150 via a display on gun 160, a display included as part of gaming outfit 180, or another portable electronic device (e.g., a cell phone) of a player 130, 140,150 (block 240). Players 130, 140, 150 leave the region of play (block 245) and are provided with their final scores (block 250).

Figure 2B:
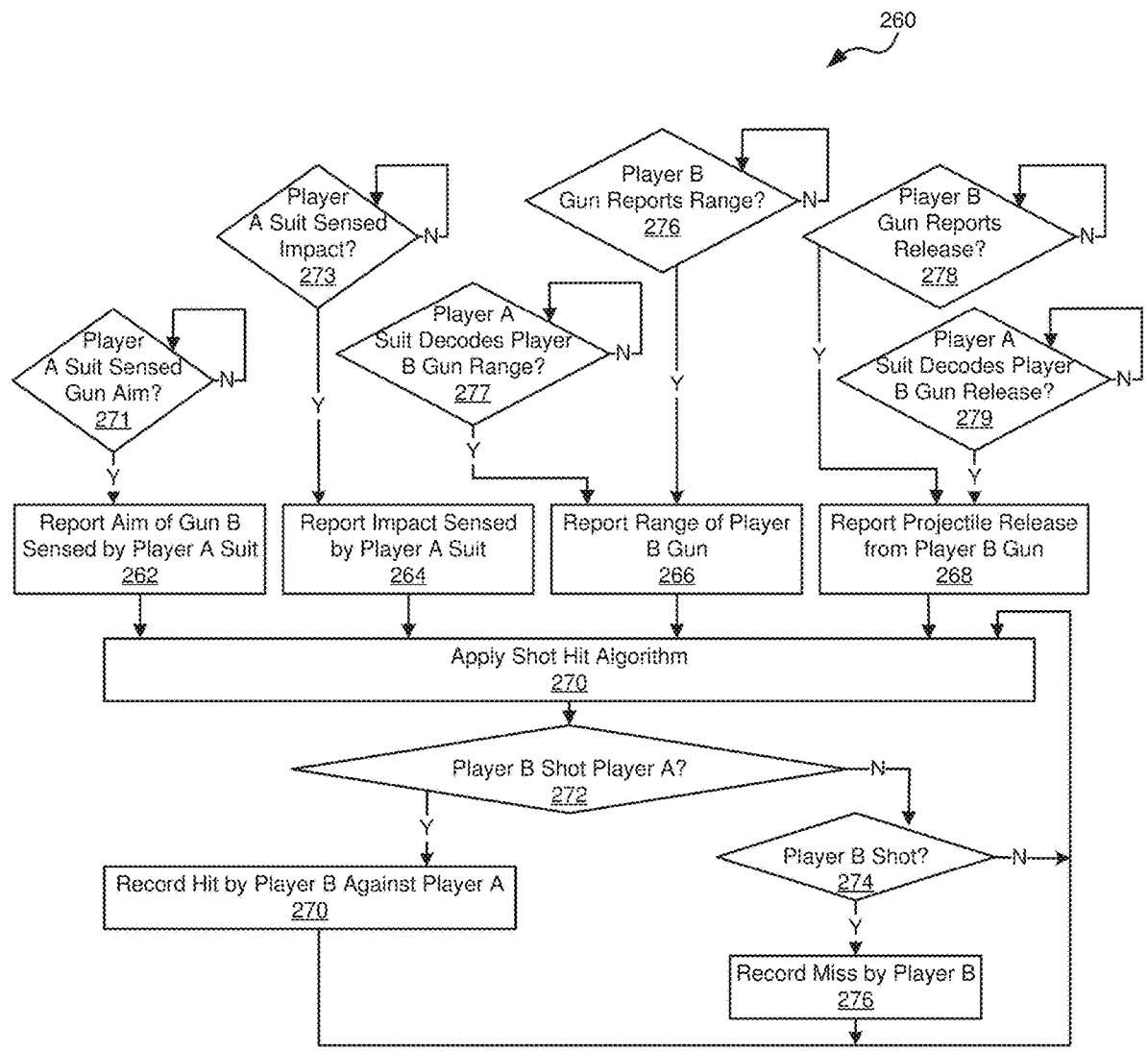

Turning to FIG. 2b, one implementation of a portion of block 220 of FIG. 1a is shown as a glow diagram 260 in accordance with some embodiments. Following flow diagram 260, gaming outfit 180 of a player A continuously monitors whether a gun 160 from any other player is aimed at gaming outfit 180 of player A (block 271). This includes receiving modulated light signals from one or more guns 160 within the region of play at one or more of optical decoder receivers 184 incorporated in or attached to gaming outfit 180 of player A. and decoding the received modulated light signals to identify gun 160 associated with the light signal. Each time a gun 160 is sensed (block 271), the gun (in this case, a gun 160 associated with a player B) is reported as being aimed at gaming outfit 180 (block 262). This reporting of the aim of gun 160 of player B is continued at a defined periodicity until the aim of gun 160 of player B is no longer detected by any of the optical decoder receivers 184 incorporated in or attached to gaming outfit 180 of player A. More than one gun 160 may be aimed at gaming outfit 180 of player A at any given time. Accordingly, gaming outfit 180 reports all guns 160 that are identified as pointing at gaming outfit 180 of player A. In some cases, each instance of a sensed gun aim is time stamped as part of the reporting process to allow for synchronizing of various inputs that may be received with different latencies.

In parallel, gaming outfit 180 of a player A continuously monitors whether gaming outfit 180 of player A has sensed an impact (block 273). This includes monitoring one or more impact pads incorporated in or attached to gaming outfit 180. Where one or more impact pads indicate an impact (block 273), an impact senses by player A suit is reported (block 264). In some cases, each instance of a sensed impact is time stamped as part of the reporting process to allow for synchronizing of various inputs that may be received with different latencies.

In parallel, gaming outfit 180 of player A continuously monitors whether gaming outfit 180 of player A has sensed range information from a gun 160 aimed at gaming outfit 180 (block 273). Where applicable, this includes decoding the modulated light signals discussed above in relation to block 271 to yield range information included in the modulated light signals by gun 160 that is aimed at gaming outfit 180 of player A in addition to the gun identification information derived as part of block 271. Each time range information is received along with identification of which gun 160 is sensed (block 273), the range information for the gun (in this case, a gun 160 associated with a player B) is reported (block 266). This reporting of the range information for gun 160 of player B is updated at the defined periodicity that the corresponding gun aim is reported until the aim of gun 160 of player B. More than one gun 160 may be aimed at gaming outfit 180 of player A at any given time. Accordingly, gaming outfit 180 reports the respective range information for all guns 160 that are identified as pointing at gaming outfit 180 of player A. Alternatively, or in addition, gun 160 of player B may provide a time stamped range information directly to central server 120 at a periodicity approximately equal to the periodicity at which gaming outfit 180 of player A reports gun aim information (blocks 266, 276).

In parallel, gaming outfit 180 of player A continuously monitors whether gaming outfit 180 of player A has sensed a projectile release from a gun 160 aimed at gaming outfit 180 (block 278). Where applicable, this includes decoding the modulated light signals discussed above in relation to block 271 to yield projectile release information included in the modulated light signals by gun 160 that is aimed at gaming outfit 180 of player A in addition to the gun identification information derived as part of block 271. Each time a projectile release information is received along with identification of which gun 160 is sensed (block 278), the projectile release information for the gun (in this case, a gun 160 associated with a player B) is reported (block 268). This reporting of the projectile release information for gun 160 of player B is updated at the defined periodicity that the corresponding gun aim is reported until the aim of gun 160 of player B. More than one gun 160 may be aimed at gaming outfit 180 of player A at any given time. Accordingly, gaming outfit 180 reports the projectile release information for all guns 160 that are identified as pointing at gaming outfit 180 of player A. Alternatively, or in addition, gun 160 of player B may provide a time stamped projectile release information directly to central server 120 at a periodicity approximately equal to the periodicity at which gaming outfit 180 of player A reports gun aim information (blocks 268, 279). While the emission of modulated light signals from a gun is discussed in this embodiment as being constant, the emission may be intermittent in other embodiments, such as, for example, for a short period after a shot is fired.

All of the information (i.e., sensed gun aim, sense impact, gun range, and/or projectile release) is provided to a processor shortly after it becomes available. Where the processor is in gaming outfit 180, providing all of the information to the processor can include using only information gathered by gaming outfit 180 or using information gathered either by gaming outfit 180 or provided to gaming outfit 180 from central server 120 (e.g., sensed gun aim and sensed impact gathered by gaming outfit 180 and gun range and projectile release reported by gun 160 to central server 120). Alternatively, where the processor is in central server 120, providing all of the information to the processor can include using only information gathered by gaming outfit 180 that is reported from gaming outfit 180 to central server 120, or using information gathered by gaming outfit 180 (e.g., sensed gun aim and sensed impact gathered by gaming outfit 180) and provide to central server 120 along with information provided directly from guns 160 to central server 120 (e.g., gun range and projectile release reported by gun 160 to central server 120). Where data inputs generated by different sources is used in the shot hit algorithm (e.g., impact information generated by gaming outfit 180 and range information reported by gun 160), time stamp information included along with the respective data inputs can be used to synchronize the utilized data inputs.

The processor applies a shot hit algorithm as data inputs are updated to determine whether a shot hit occurred, which player receives credit for the shot hit, which player sustained the shot hit, and/or which player sustained a shot miss (block 270). A variety of shot hit algorithms may be applied in different embodiments where each of the algorithms rely upon multiple data inputs to determine a shot hit. In some embodiments, the at least one element of the multiple data inputs is generated by a gun 160 of one player and at least another element of the multiple data inputs is generated by a gaming outfit 180 of another player. Such a multiple data input algorithm increases the accuracy of shot hit detection when compared with single data input shot hit determination.

In some embodiments, the shot hit algorithm is designed to avoid indicating a shot hit based upon impact alone where, for example, the impact may have occurred when a player wearing gaming outfit 180 runs into a feature in the game. In some embodiments, a shot hit is based upon a combination of an impact indicated by an impact detection circuit of an impact pad 181 of gaming outfit 180 (i.e., a reported impact of block 264) and reception of an indication of a particular gun 160 (i.e., a reported identification of a gun aimed at gaming outfit 180 of block 262). The following pseudo-code represents one embodiment of a shot hit algorithm:

If (impact reported && gun identification reported){
   Indicate a shot hit by the gun associated with the gun
     identification}
Else{
   Indicate no shot hit}

The aforementioned algorithm avoids spurious indications of shot hit based upon impact detection alone. Further, the aforementioned algorithm identifies which player is credited with the shot hit.

Other embodiments further refine indication of shot hits by further considering a projectile release (i.e., shot fired) by an identified gun. The following pseudo-code represents another embodiment for a shot hit algorithm:

If (impact reported && gun identification reported){
   If(projectile released by the identified gun){
     Indicate a shot hit by the gun associated with the gun
       identification}
   Else{
     Indicate no shot hit}
Else{
   Indicate no shot hit}

The aforementioned algorithm further limits spurious indications of shot hit based upon impact detection alone. Further, the aforementioned algorithm identifies which player is credited with the shot hit.

Yet other embodiments further refine indication of shot hits by further considering a range of the identified gun from a gaming outfit 180 where an impact was sensed. The following pseudo-code represents another embodiment for a shot hit algorithm:

If (impact reported && gun identification reported){
   If(projectile released by the identified gun && range of
     the identified gun available){
     calculate time from projectile release by the identi-
       fied gun to impact;
     divide range of the identified gun by the calculated
       time to yield velocity;
     If(calculated velocity is within window of the
       expected projectile velocity){
       Indicate a shot hit by the gun associated with the
         gun
         identification}
     Else{
       Indicate no shot hit}

```
Else{
    Indicate no shot hit}
Else{
    Indicate no shot hit}
```

The aforementioned algorithm further limits spurious indications of shot hit based upon impact detection and shot fired alone. Further, the aforementioned algorithm is able to discern which gun was responsible for a particular impact where two or more guns are identified and indicate a shot fired where the distance of each of the guns from the suit registering the impact is different.

The algorithm reports any shot hits along with identifying the player credited with the shot hit and the player that sustained the shot hit. From this it is determined whether player A shot player B (block 272). Where player A shot player B, a shot hit is recorded for player B and against player A (block 270) as part of the scoring process.

Where it is determined that player B did not shoot player A (block 272), it is determined whether a projectile was released from gun 160 of player B based upon reported projectile release information (block 274). Where a projectile was released from gun 160 of player B (block 274), a shot miss is recorded against player B (block 276). This shot hit and shot miss information is used as part of a scoring algorithm generating individual scores for the respective players.

Figure 3:
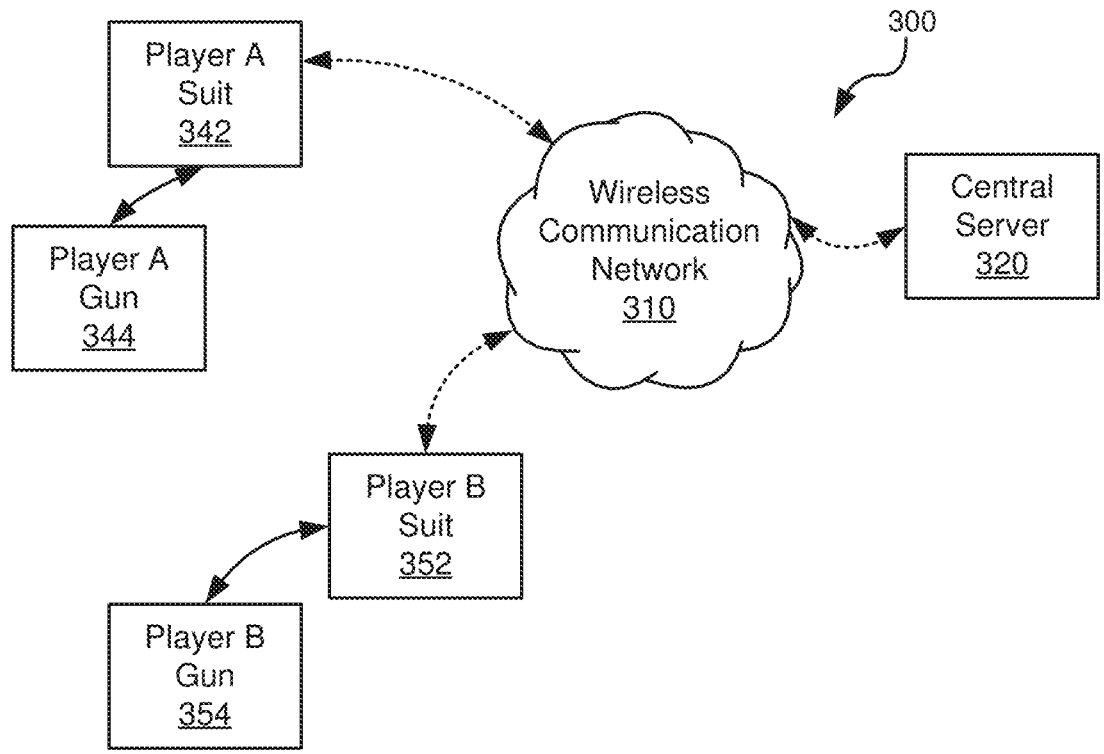
FIGS. 3-6 show various alternative game scenarios in accordance with other embodiments.

FIGS. 3-6 show a variety of game scenarios that may be implemented in accordance with different embodiments. Turning to FIG. 3, a block diagram 100 shows various components used in another example game scenario. In particular, a gun of player A 342 is direct wired to a gaming outfit of player A 344. Similarly, a gun of player B 354 is direct wired to a gaming outfit of player B 352. Gaming outfit of player A 342 and gaming outfit of player B 352 are communicably coupled to a central server 320 via a wireless communication network 310. In this scenario, all communications between gun of player A 344 and central server 320 are carried out via the wireless communication circuitry implemented as part of gaming outfit of player A 342; and all communications between gun of player B 354 and central server 320 are carried out via the wireless communication circuitry implemented as part of gaming outfit of player B 352. Other than the change in communication paths, other operations as discussed above in relation to FIGS. 1-2 can be implemented in substantially the same way.

Figure 4:
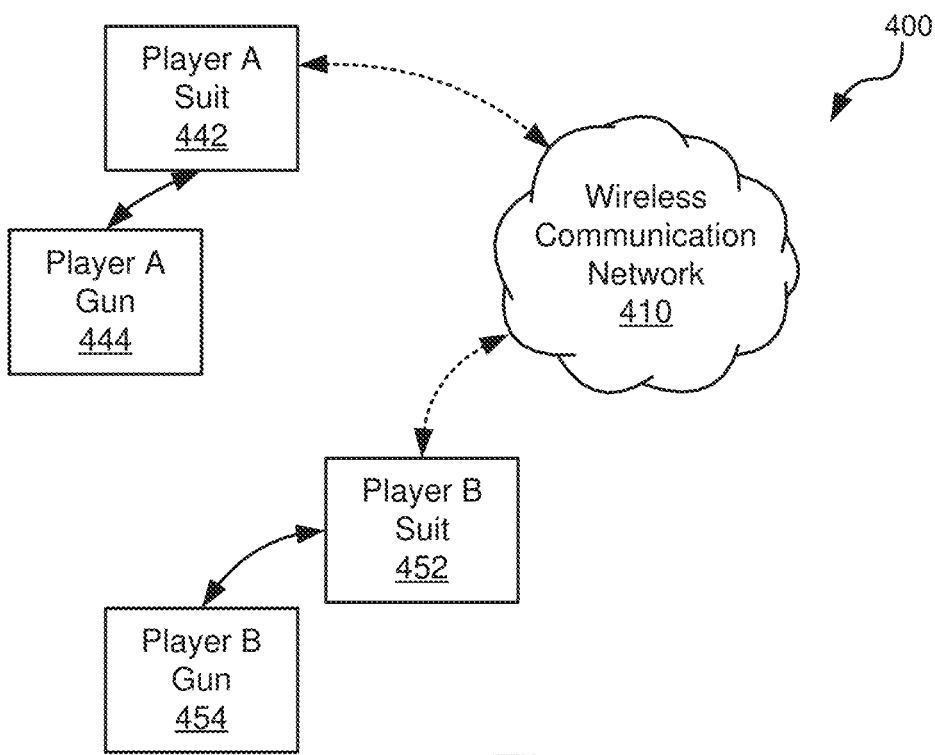

Turning to FIG. 4, a block diagram 400 shows various components used in yet another example game scenario. In particular, a gun of player A 442 is direct wired to a gaming outfit of player A 444. Similarly, a gun of player B 454 is direct wired to a gaming outfit of player B 452. Gaming outfit of player A 442 and gaming outfit of player B 452 are communicably coupled to each other via a wireless communication network 410. In this scenario, there is no central server and either one player is designated as a master with their gaming outfit controlling one or more of the functions discussed above as being supported by central server 120, or the gaming outfit of each player being designated as performing a subset of the functions discussed above as being supported by central server 120. Other than the change in communication paths and the distribution of one or more of the functions discussed in relation to central server 120, other operations as discussed above in relation to FIGS. 1-2 can be implemented in substantially the same way.

Figure 5:
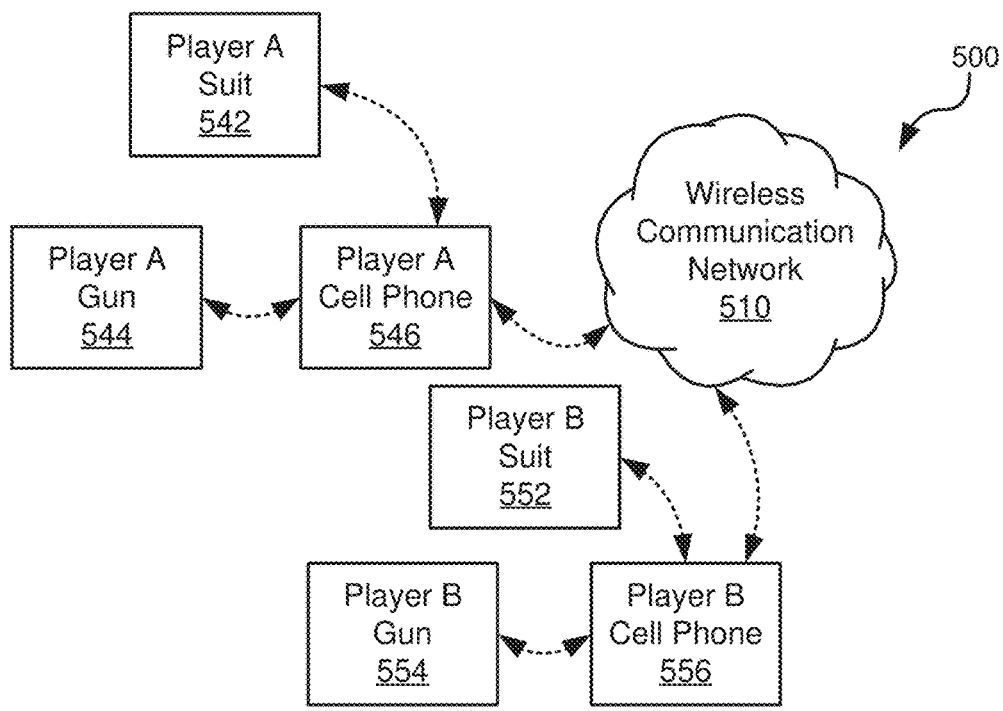

Turning to FIG. 5, a block diagram 500 shows various components used in yet another example game scenario. In particular, a gun of player A 542 and a gaming outfit of player A 544 are wirelessly coupled to a cell phone of player A 546. Such wireless coupling may be, for example, via a Bluetooth™ communication connection. A gun of player A 552 and a gaming outfit of player A 554 are wirelessly coupled to a cell phone of player A 556. Again, such wireless coupling may be, for example, via a Bluetooth™ communication connection. Communications between cell phones is done via a wireless communication network 510. Other than the change in communication paths and distribution of one or more of the functions discussed in relation to central server 120, other operations as discussed above in relation to FIGS. 1-2 can be implemented in substantially the same way.

Figure 6:
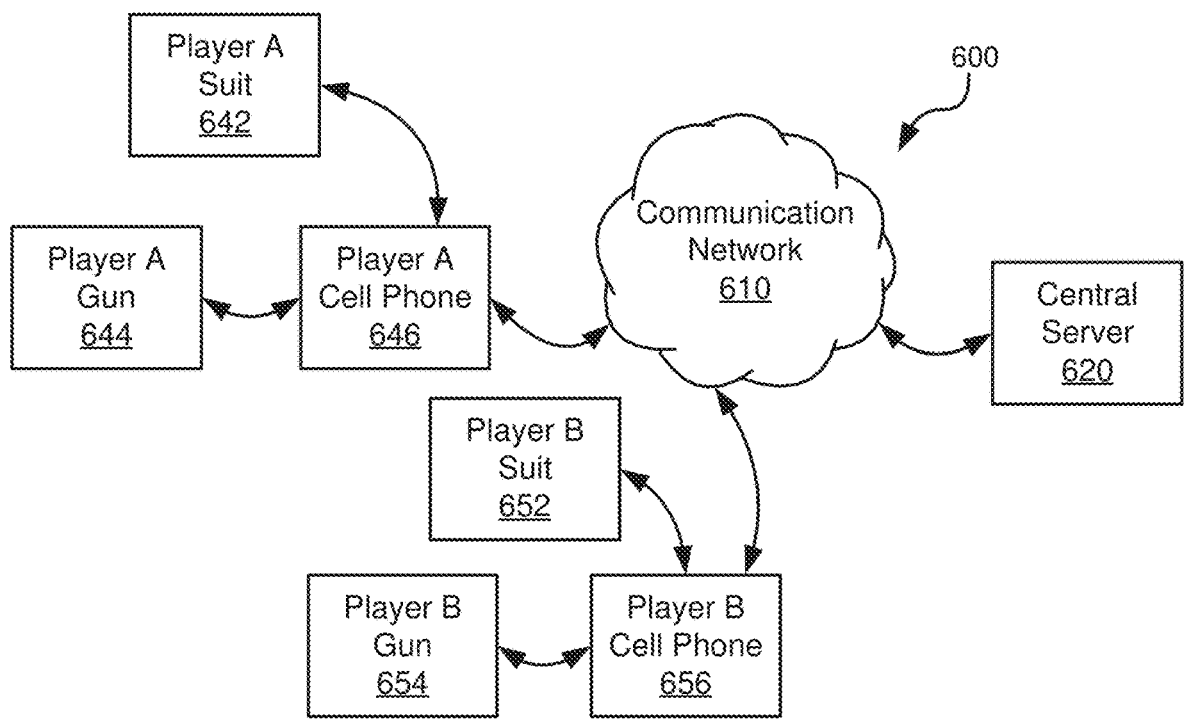

Turning to FIG. 6, a block diagram 600 shows various components used in yet another example game scenario. In particular, a gun of player A 642 and a gaming outfit of player A 644 are wirelessly coupled to a cell phone of player A 646. Such wireless coupling may be, for example, via a Bluetooth™ communication connection. A gun of player A 652 and a gaming outfit of player A 654 are wirelessly coupled to a cell phone of player A 656. Again, such wireless coupling may be, for example, via a Bluetooth™ communication connection. Communications between cell phones and a central server 620 is done via a wireless communication network 610. Other than the change in communication paths, other operations as discussed above in relation to FIGS. 1-2 can be implemented in substantially the same way.

Figure 7:
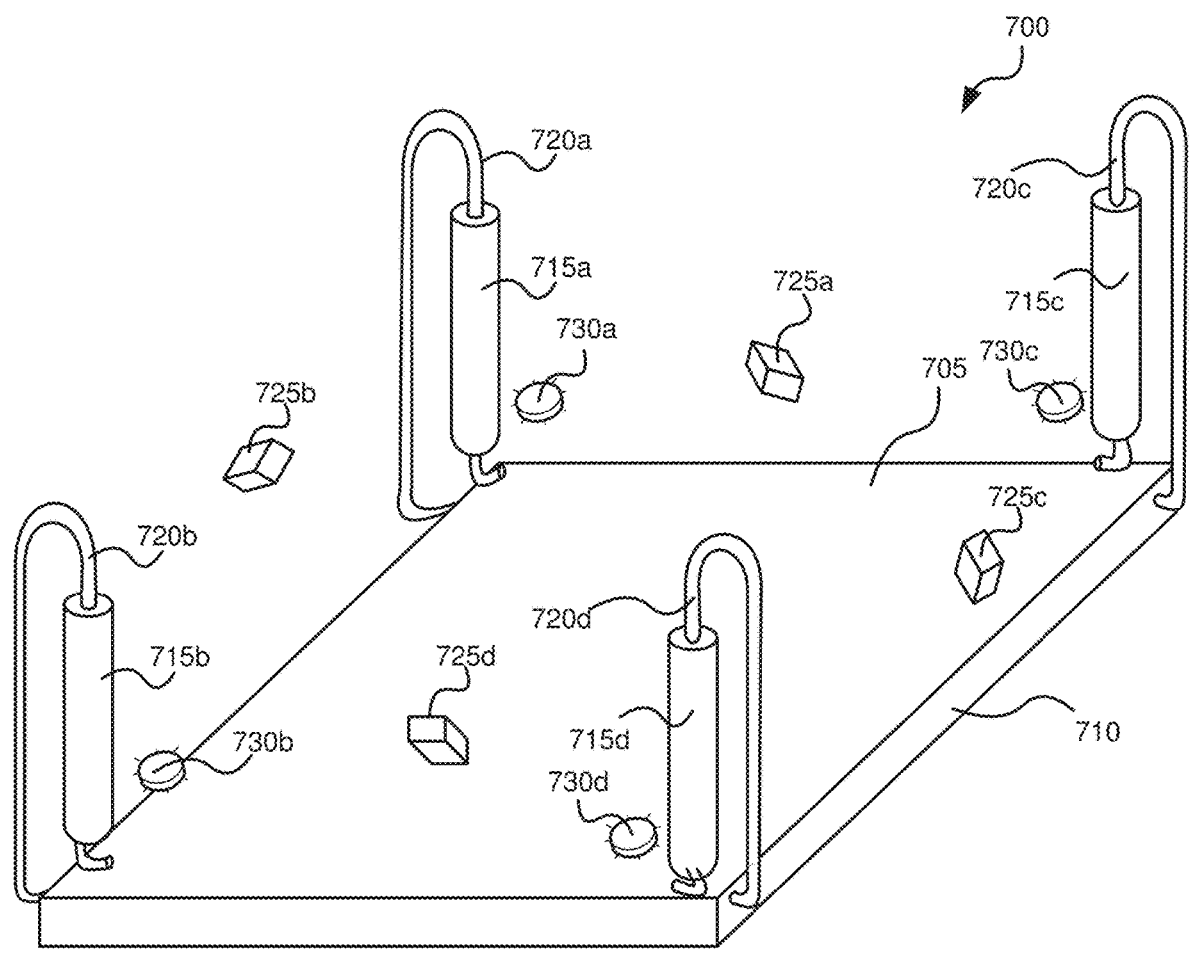
FIG. 7 shows a gaming arena in accordance with some embodiments.

Turning to FIG. 7, a gaming arena 700 in accordance with some embodiments where the game scenarios discussed above in relation to FIGS. 1-2 may be played. Based upon the disclosure provided herein, one of ordinary skill in the art will recognize other gaming arenas and/or regions of play that may be utilized in accordance with different embodiments. As shown, gaming arena 700 includes a sub-floor 705 extending above another level with a space 710 therebetween. Sub-floor 705 is grated with openings sufficiently larger to allow projectiles to fall through into space 710, and sufficiently small to support players walking on sub-floor 705.

A vacuum system 720 sucks projectiles collected in space 710 into projectile storage devices 715. Projectile storage devices 715 are cylindrical devices that hold a number of projectiles that may be easily moved into a gun 160 presented by a player at the device. The locations of the projectile storage devices 715 may be designated safe spaces where shots are not recorded against a player at the location.

A number of cameras 725 (shown as cameras 725a, 725b, 725c, 725d) are distributed around gaming arena 700 that are capable of recording the ongoing game scenario. In some cases, images recorded using cameras 725 is used by a central server (not shown) to identify locations of different players and to transmit such location information to guns 160 of the various players. In addition, various communication and location devices 730 (shown as cameras 730a, 730b, 730c, 730d) are distributed around gaming arena 700 that are capable of supporting wireless communications between gaming outfits 180, guns 160, central server 120, and/or cell phones of the players during the ongoing game scenario. In addition, communication and location devices 730 may provide reports on player locations based upon RFID locating and/or triangulation. While not shown, gaming arena 700 may further include displays showing different angles of video captured from cameras 725.

In conclusion, the present invention provides for novel systems, devices, and methods for live action game play. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A live action game system, the system comprising:
a region of play, wherein the region of play includes:
a projectile load station configured to provide projectiles to at least a first player and a second player within the region of play;
at least one location detection device configured to detect the location of at least the first player and the second player within the region of play;
a projectile collection system configured to collect projectiles propelled by a first gun associated with the first player and projectiles propelled by a second gun associated with the second player, and to return the collected projectiles to the projectile load station;
a first gaming outfit associated with the first player;
a second gaming outfit associated with the second player;
wherein the first gaming outfit includes a processing circuit operable to:
detect that a second player associated with the second gaming outfit is targeting a first player associated with the first gaming outfit to yield a player identification;
detect an impact with the first gaming outfit to yield an impact identification; and
determine a shot hit by the second player against the first player by a projectile propelled by the second gun based upon a combination of the player identification and the impact identification; and
a central server configured to:
receive the shot hit from the first gaming outfit, and the location of at least the first player and the second player within the region of play from the location detection device; and
transmit game information to the first gaming outfit and the second gaming outfit.

2. The system of claim 1, wherein the central server is further configured to detect that the second gun is aimed at the first player, and wherein the player identification is a gun identification identifying the second gun.

3. The system of claim 2, wherein the central server is further configured to detect a projectile release by the second gun to yield a projectile release indication; and wherein determining the shot hit by the second player against the first player by a projectile propelled by the second gun is based upon a combination of the gun identification, the impact identification, and the projectile release indication.

4. The system of claim 3, the central server is further configured to receive a range of the second gun to the first gaming outfit to yield a range indication; and wherein determining the shot hit by the second player against the first player by a projectile propelled by the second gun is based upon a combination of the gun identification, the impact identification, the projectile release indication, and the range indication.

5. The system of claim 2, wherein determining the shot hit by the second player against the first player by a projectile propelled by the second gun is based upon a combination of the gun identification, the impact identification, and a projectile release indication indicating a projectile release from the second gun.

6. The system of claim 2, wherein determining the shot hit by the second player against the first player by a projectile propelled by the second gun is based upon a combination of the gun identification, the impact identification, a projectile release indication indicating a projectile release from the second gun, and a range indication indicating a distance from the second gun to the first player.

7. The system of claim 2, wherein the first gaming outfit includes:
an impact detection pad configured to sense an impact by a projectile propelled from the second gun; and
an optical decoder receiver configured to receive an optically modulated signal from the second gun, wherein the optically modulated signal includes an identification of the second gun.

8. The system of claim 7, wherein the impact detection pad is a piezo electric based impact pad.

9. The system of claim 7, wherein the impact detection pad is an electrical continuity-based impact pad including a first electrode and a second electrode, and wherein the impact detection pad is configured to signal an impact when the first electrode is shorted to the second electrode by an electrically conductive element.

10. The system of claim 9, wherein the projectile is an electrically conductive element.

11. The system of claim 2, wherein the first gaming outfit includes:
a helmet; and
a sensor suit.

12. The system of claim 2, wherein the first gaming outfit includes:
a helmet; and
a sensor suit, wherein the suit is communicably coupled to the helmet.

13. The system of claim 2, wherein the first gaming outfit includes:
a helmet; and
a sensor suit, wherein at least one of the sensor suit or the helmet is communicably coupled to the gun.

14. A live action game system, the game system comprising:
a first gaming outfit and a first gun;
a second gaming outfit and a second gun;
wherein the first gaming outfit includes a processing circuit operable to:
detect that a second player associated with the second gaming outfit is targeting a first player associated with the first gaming outfit to yield a player identification;
detect an impact with the first gaming outfit to yield an impact identification; and
determine a shot hit by the second player against the first player by a projectile propelled by the second gun based upon a combination of the player identification and the impact identification.

15. The system of claim 14, wherein the processing circuit is operable to detect that the second gun is aimed at the first player, and wherein the player identification is a gun identification identifying the second gun.

16. The system of claim 15, wherein the processing circuit is further operable to detect a projectile release by the second gun to yield a projectile release indication; and wherein determining the shot hit by the second player against the first player by a projectile propelled by the second gun is based upon a combination of the gun identification, the impact identification, and the projectile release indication.

17. The system of claim 16, wherein the processing circuit is further operable to detect a range of the second gun to the first gaming outfit to yield a range indication; and wherein determining the shot hit by the second player against the first player by a projectile propelled by the second gun is based upon a combination of the gun identification, the impact identification, the projectile release indication, and the range indication.

18. The system of claim 15, wherein determining the shot hit by the second player against the first player by a projectile propelled by the second gun is based upon a combination of the gun identification, the impact identification, and a projectile release indication indicating a projectile release from the second gun.

19. The system of claim 15, wherein determining the shot hit by the second player against the first player by a projectile propelled by the second gun is based upon a combination of the gun identification, the impact identification, a projectile release indication indicating a projectile release from the second gun, and a range indication indicating a distance from the second gun to the first player.

20. The system of claim 15, wherein the first gaming outfit includes:
 an impact detection pad configured to sense an impact by a projectile propelled from the second gun; and
 an optical decoder receiver configured to receive an optically modulated signal from the second gun, wherein the optically modulated signal includes an identification of the second gun.

21. The system of claim 20, wherein the impact detection pad is a capacitance-based impact pad.

22. The system of claim 20, wherein the impact detection pad is an electrical continuity-based impact pad including a first electrode and a second electrode, and wherein the impact detection pad is configured to signal an impact when the first electrode is shorted to the second electrode by an electrically conductive element.

23. The system of claim 22, wherein the projectile is an electrically conductive element.

24. The system of claim 15, wherein the first gaming outfit includes:
 a helmet; and
 a sensor suit.

25. The system of claim 15, wherein the first gaming outfit includes:
 a helmet; and
 a sensor suit, wherein the suit is communicably coupled to the helmet.

26. The system of claim 15, wherein the first gaming outfit includes:
 a helmet; and
 a sensor suit, wherein at least one of the sensor suit or the helmet is communicably coupled to the gun.

* * * * *